US010109092B1

United States Patent
Hitchings, Jr.

(10) Patent No.: US 10,109,092 B1
(45) Date of Patent: Oct. 23, 2018

(54) AUTOMATED TEXT LAYOUT, COLOR AND OTHER STYLIZATION ON AN IMAGE OR VIDEO, AND THE TRACKING AND APPLICATION OF USER COLOR PREFERENCES

(71) Applicant: Imagical LLC, Los Altos, CA (US)

(72) Inventor: Sinclair Hamilton Hitchings, Jr., Palo Alto, CA (US)

(*) Notice: Subject to any disclaimer, the term of this patent is extended or adjusted under 35 U.S.C. 154(b) by 122 days.

(21) Appl. No.: 15/069,906

(22) Filed: Mar. 14, 2016

Related U.S. Application Data

(60) Provisional application No. 62/297,142, filed on Feb. 19, 2016, provisional application No. 62/137,697, filed on Mar. 24, 2015.

(51) Int. Cl.
| | | |
|---|---|---|
| G06K 9/00 | (2006.01) | |
| G06T 11/60 | (2006.01) | |
| G06T 11/00 | (2006.01) | |

(52) U.S. Cl.
CPC ............ G06T 11/60 (2013.01); G06T 11/001 (2013.01)

(58) Field of Classification Search
CPC  G06T 7/70; G06T 11/001; G06T 7/90; G06K 9/3233; G06K 9/46; G06K 9/4647; G06F 3/04817; G06F 3/04845; G06F 3/1208; G06F 8/38; G06F 17/30247; G06F 2203/04804; G06F 3/0482; G09G 5/00; G09G 5/02; G09G 5/026; G09G 5/06; G09G 5/30; G09G 2320/0606;
(Continued)

(56) References Cited

U.S. PATENT DOCUMENTS

| 5,901,245 A | 5/1999 | Warnick et al. |
| 6,711,291 B1 | 3/2004 | Stubler et al. |

(Continued)

FOREIGN PATENT DOCUMENTS

EP    1085464 B1    10/2009

*Primary Examiner* — Jose L Couso
(74) *Attorney, Agent, or Firm* — Brad Bertoglio

(57) ABSTRACT

Devices and methods for overlaying text content on photos are provided. A digital image is selected. Unique foreground colors from the image are extracted, filtered and color clusters are identified for each foreground color. Color frequency and cluster count within the image are calculated. Text is entered by a user or provided programmatically. Multiple candidate locations for text content are evaluated to identify one or more optimal caption locations on the digital image. One or more suggested text colors are identified for each of the candidate location regions, based on factors including color contrast with background image content at the candidate text location region. The optimal text location regions and colors can be utilized to overlay text content onto the initial digital image to generate an output image. The process can be applied to sampled frames from a video feed. The process can be applied to a mobile device camera application by sampling and compressing frames from an electronic viewfinder video feed, overlaying text content on the preview video feed, capturing a full-resolution image in response to actuation of a camera shutter button, and processing the full-resolution image to yield a final full-resolution captioned output. The result can be transmitted to a social network service or application.

39 Claims, 22 Drawing Sheets
(15 of 22 Drawing Sheet(s) Filed in Color)

(58) Field of Classification Search
CPC ..... G09G 2320/066; G09G 2320/0666; G09G 2340/10; G09G 2340/12; G09G 2340/14; G09B 21/008; G01B 11/22; G01B 11/24; G02B 5/1814; G02B 5/3025; G03B 35/08; H04N 1/60; H04N 1/6027; H04N 1/6088; H04N 1/62; H04N 5/272; H04N 9/76; H04N 13/0217; H04N 5/278; H04N 2005/44526; H04N 21/4312; H04N 21/4884; H04N 9/74; Y10S 707/99943; Y10S 707/99945; G11B 27/031; G10H 2220/091

See application file for complete search history.

(56) References Cited

U.S. PATENT DOCUMENTS

| | | |
|---|---|---|
| 6,809,741 B1 | 10/2004 | Bates et al. |
| 7,480,405 B2 | 1/2009 | Poynter |
| 9,190,015 B2* | 11/2015 | Kim ............................ G09G 5/00 |
| 9,576,554 B2* | 2/2017 | Guo ............................ G09G 5/02 |
| 9,966,037 B2* | 5/2018 | Malik ........................ G09G 5/026 |
| 2006/0044324 A1 | 3/2006 | Shum et al. |
| 2008/0204471 A1* | 8/2008 | Jaeger ........................ G09G 5/02 <br> 345/594 |
| 2011/0074807 A1* | 3/2011 | Inada ...................... G06T 11/001 <br> 345/589 |
| 2014/0040802 A1* | 2/2014 | Abanami ................. G06F 3/0481 <br> 715/768 |
| 2014/0281847 A1* | 9/2014 | Marra ...................... G06F 17/212 <br> 715/202 |
| 2016/0093080 A1* | 3/2016 | Tumanov ................. G06T 11/60 <br> 345/589 |
| 2016/0227134 A1* | 8/2016 | Voss ......................... H04N 5/278 |
| 2016/0232696 A1* | 8/2016 | Voss ........................... G06T 7/90 |
| 2016/0358592 A1* | 12/2016 | Rogoyski ................... G09G 5/40 |
| 2017/0032553 A1* | 2/2017 | O'Donovan ............. G06N 7/005 |
| 2017/0178373 A1* | 6/2017 | Sarafa ..................... G06T 11/001 |
| 2017/0200296 A1* | 7/2017 | Jones ........................ G06T 11/60 |

* cited by examiner

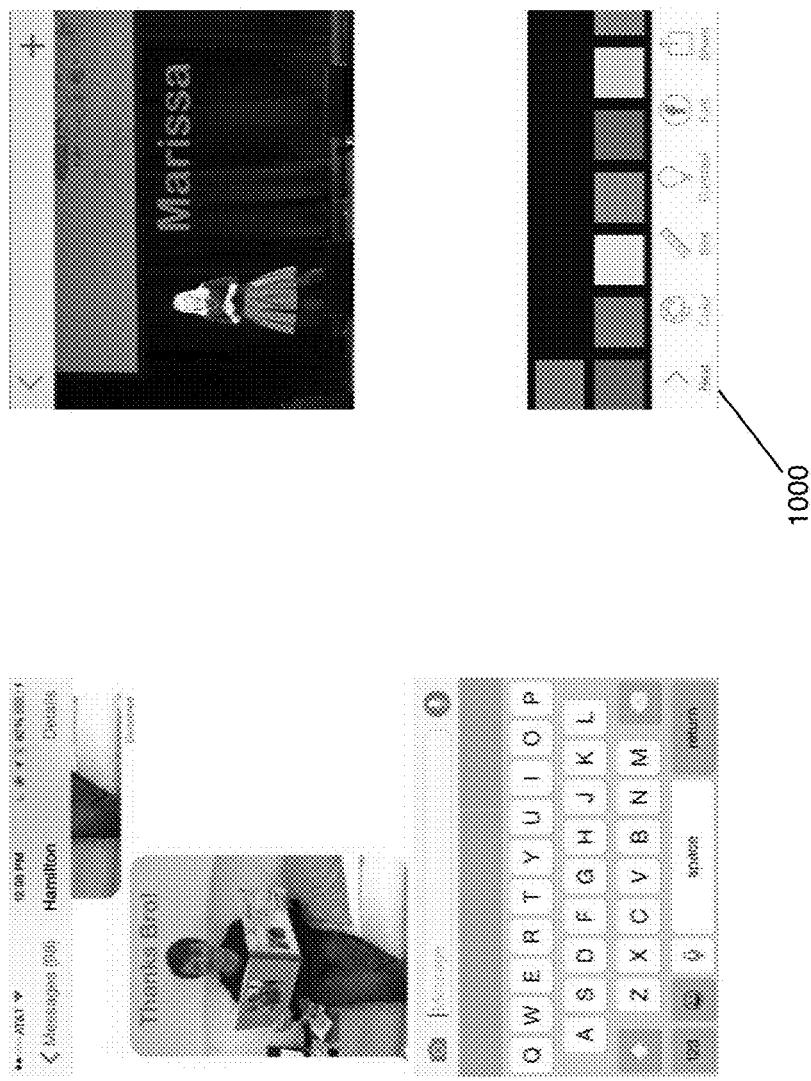

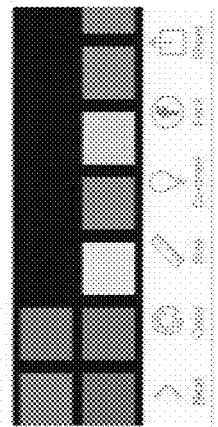
FIG. 12
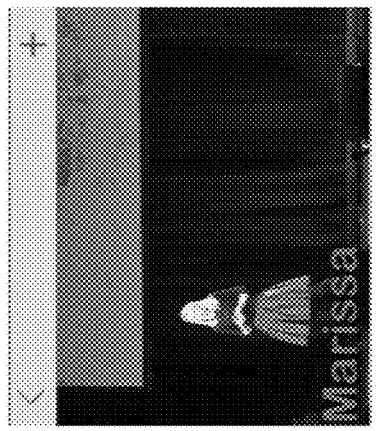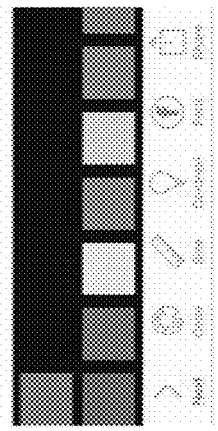
FIG. 11

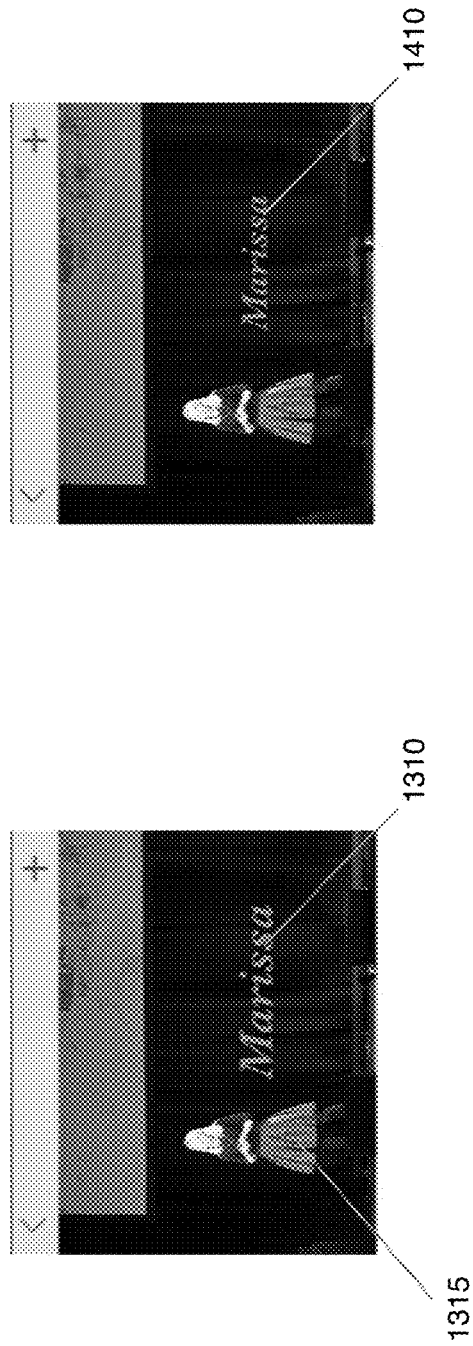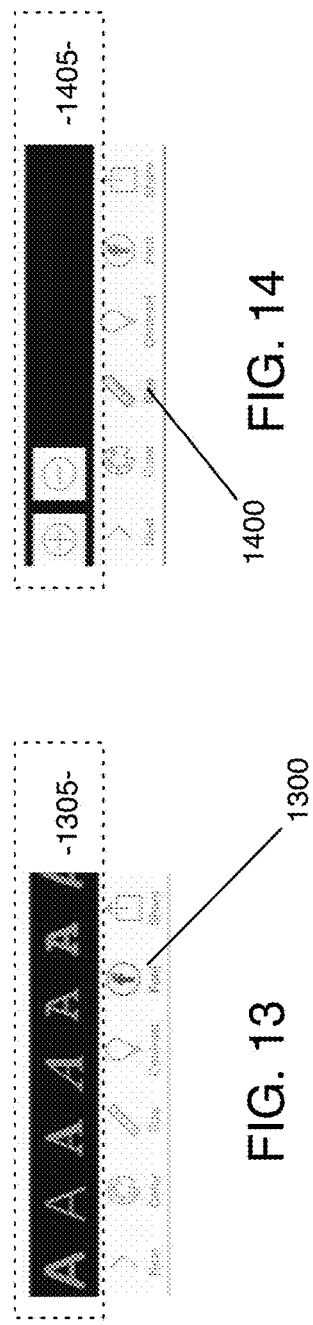
FIG. 13
FIG. 14

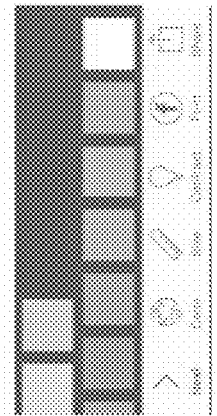
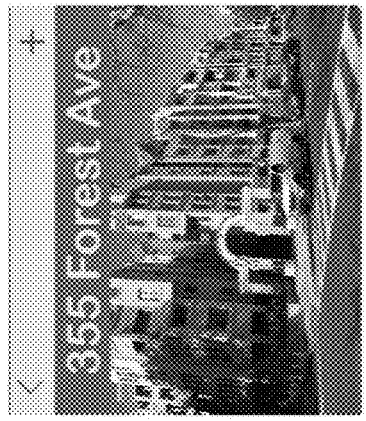
FIG. 18
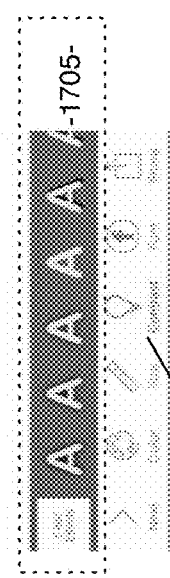
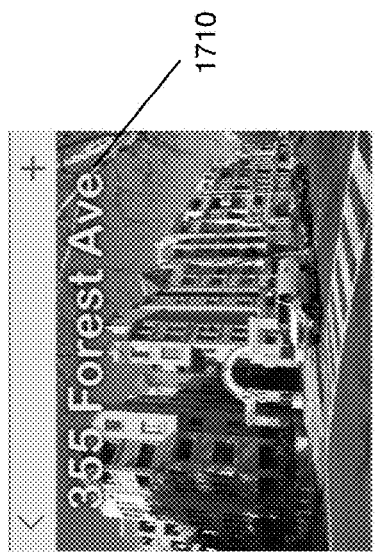
FIG. 17

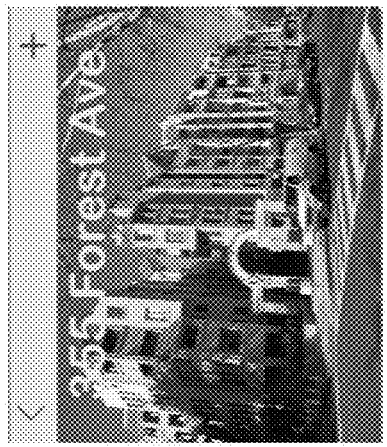
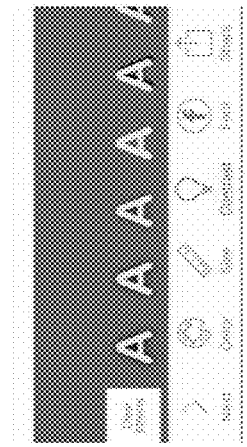
FIG. 20
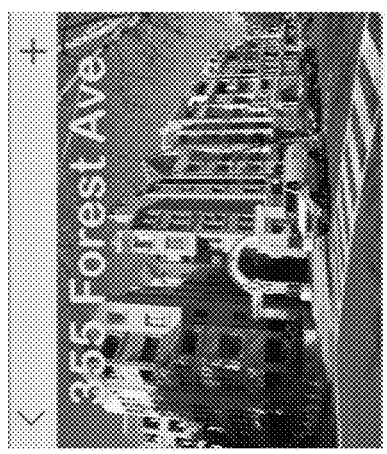
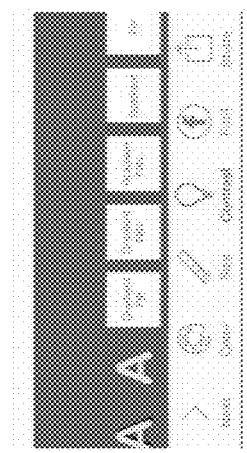
FIG. 19

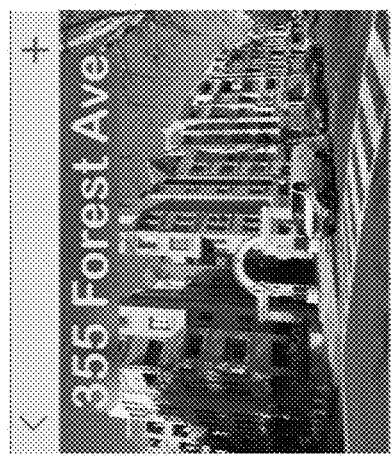
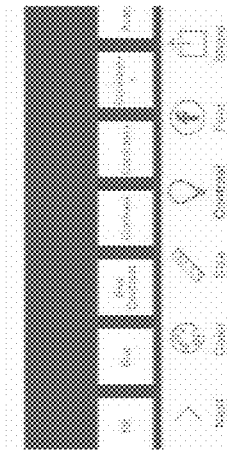
FIG. 22
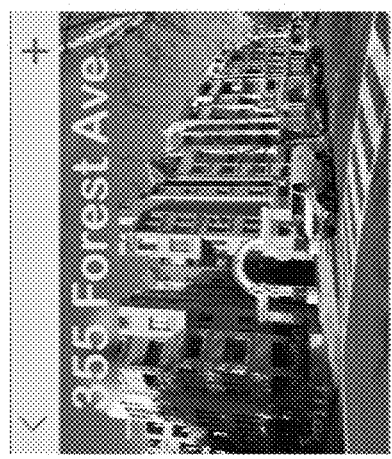
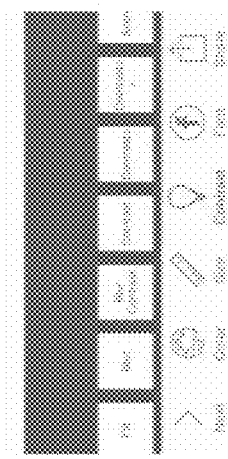
FIG. 21

AUTOMATED TEXT LAYOUT, COLOR AND OTHER STYLIZATION ON AN IMAGE OR VIDEO, AND THE TRACKING AND APPLICATION OF USER COLOR PREFERENCES

TECHNICAL FIELD

The present disclosure relates in general to enhancement of digital photos and video, and in particular to automatically finding optimal locations, colors and other stylizations for captioning an image or video content, so that the text appearance is readable and harmonious.

BACKGROUND

Handheld computing devices, such as smartphones, now contain quality cameras that are capable of capturing and storing images digitally. Smartphone messaging applications are one of the most popular categories of mobile applications. Users often send each other images through messaging applications. They often send text separately that accompanies the photo and conveys a message such as "I Miss You" or "Sarah's first steps". Typically this text is not overlaid on the image but sent as a separate message component and displayed separately above, below or one side of the photo. This is often referred to as "Photo Texting".

There are currently mobile applications that allow users to caption an image by manually placing text on an image at a location manually specified by the user, with a color that is manually selected by the user. It is typically a time consuming and difficult task for most people to select a very good text location and color that not only contrasts well and is easily readable, but is also harmonious with the digital photo.

SUMMARY

Embodiments disclosed herein allow a user of, e.g., a handheld computing device such as a mobile phone, to automatically caption an image or video by overlaying text, the text being applied with location, color and other stylization that is easy to read and aesthetically pleasing. The user may then edit the text location, color, font, size or background effects. Optimal text location, color and other stylization options may be presented to the user for consideration and selection. The user may then save the image with the text stored as part of the image or transmit the enhanced image to another user, such as via messaging protocols or applications.

Embodiments include systems and methods for automatically identifying the best locations to place text on an image, determining the best layouts of the text and optimal coloring of the text. Preferably, locations are presented that are symmetrically pleasing to the user's eyes and upon which text will be easier to read, such as smooth, light or dark backgrounds. The results are intended to be clearly readable when applied to many different types of images, including those that have noisy backgrounds upon which text of any color would normally be difficult to read. Colors are preferably selected to be harmonious with the image and typically much more pleasing to the eye than only using black or white text, even when there are no good colors to extract from the image. These results are typically clearly readable even by individuals suffering from common forms of color blindness, and even in the rare case of individuals who only see grayscale. Embodiments may be completely automatic and typically do not require manual tuning to produce satisfactory results for a wide variety of images and viewers.

Embodiments may implement techniques and processes sometimes referred to as a Machine Automated Graphical Image Coloring And Layout (MAGICAL) system. Inputs may include an image and a set of text regions containing the properties of the text, such as width, height, font size and number of newlines. The MAGICAL system returns a list of optimal text locations for the text region sorted from best (i.e. highest scoring) locations, to slightly less desirable (i.e. somewhat lower scoring) locations. Moderate and low scoring text locations are preferably not returned by default. Each text location may include text x and y coordinates on the image, text width and height, font size and number of new lines. Each text location may also include a sorted list of preferred text colors associated with that text location, and a recommended background effect for that text location (or none).

In accordance with another aspect, a network-connected color preference server can be provided. The color preference server can aggregate information associated with individual color likes/dislikes and/or color blindness disabilities for users, individually and/or in demographic aggregates. Individual and/or demographic color preference information can be conveyed via a digital network, such as via Internet API calls, to other applications, including, inter alia, applications running on user devices (such as image-text overlay applications), server-based applications and other web services. In some embodiments, user color preferences are utilized to impact the display of Internet-served advertisements (such as serving user-customized versions of advertisements utilizing preferred color combinations, and/or utilizing color preferences as a factor in selecting an ad to be served from amongst a plurality of candidate ads), potentially enhancing the strength of the ad's commercial impression and/or click-through rate.

BRIEF DESCRIPTION OF THE DRAWINGS

The patent or application file contains at least one drawing executed in color. Copies of this patent or patent application publication with color drawings will be provided by the Office upon request and payment of the necessary fee.

FIGS. 5-22 are user interface renderings of a smart phone mobile device embodiment.

DETAILED DESCRIPTION OF THE DRAWINGS

Figure 1A:
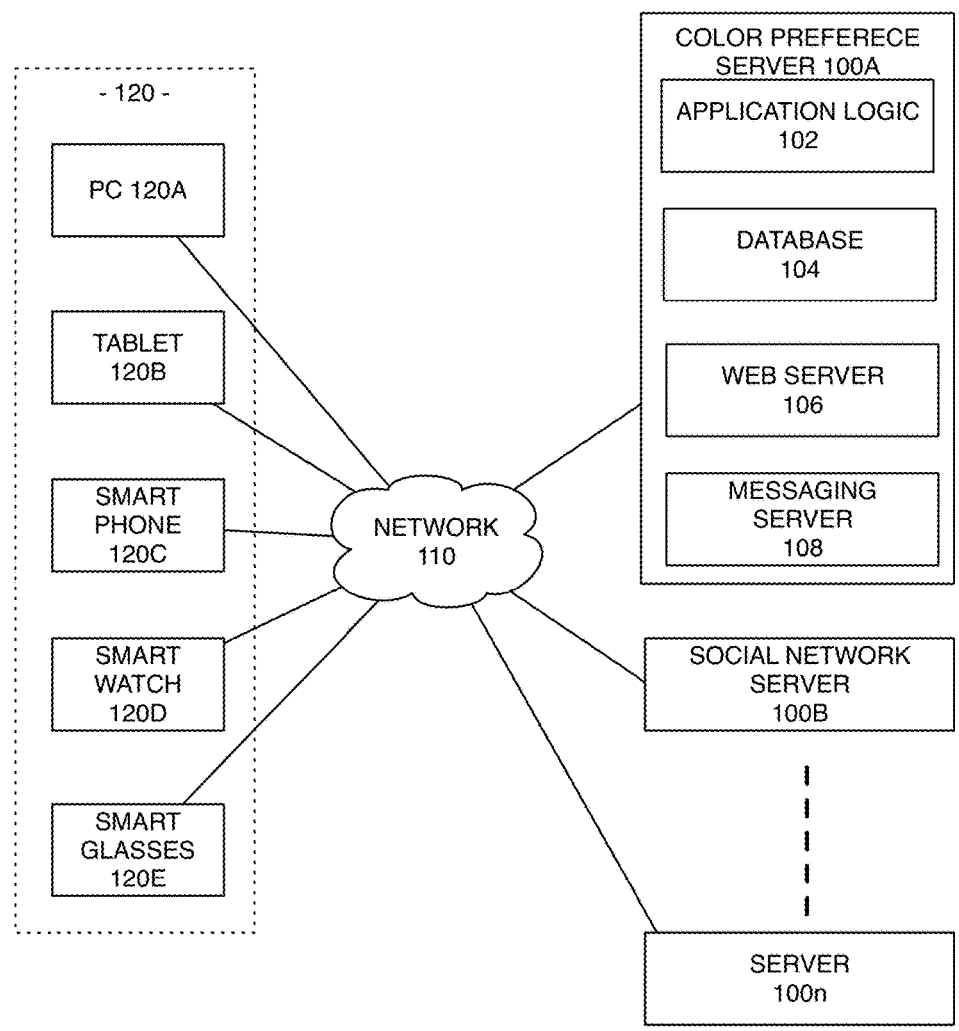
FIG. 1A is a schematic block diagram of a computing environment.

While this invention is susceptible to embodiment in many different forms, there are shown in the drawings and will be described in detail herein several specific embodiments, with the understanding that the present disclosure is to be considered as an exemplification of the principles of the invention to enable any person skilled in the art to make and use the invention, and is not intended to limit the invention to the embodiments illustrated.

Amongst the technical terms used herein are luminance, hue and saturation. Luminance is measure of intensity of light illuminating a surface of a given area, corrected for sensitivity of the eye to the various wavelengths of light of the composing source. This is also referred to as perceived brightness and typically will be referred to as such in this disclosure. Hue may be considered to be the dominant wavelength of a color, i.e., the attribute of a color perception denoted by blue, green, red, etc. Saturation defines a range from pure color (100%) to gray (0%).

FIG. 1A is a schematic block diagram of a computing environment in which embodiments described herein can be implemented. User computing devices 120, such as personal computer 120A, tablet computer 120B, smart phone 120C, smart watch 120D, or smart glasses 120E, operate to execute software, process data and present graphical displays to users thereof. Computing devices 120 are preferably interconnected with network 110, which may include the Internet, for communication with one or more servers 100. That said, some embodiments described herein can also be beneficially implemented on standalone computing devices, such as devices 120, whether connected to a digital network or not. While FIG. 1 illustrates five exemplary user computing devices, it is contemplated and understood that implementations may include one such device, or large numbers of user devices communicating with one another. For example, some implementations may include user devices for numerous members of a common social network, one or more users having electronic contact information for each other stored within their user devices, and other scenarios. In some circumstances, a given individual may utilize multiple user devices in connection with the illustrated embodiments.

Servers 100 may implement one or more web services or other applications. For example, servers 100 may include one or more social network servers 100B, such as Facebook, Instagram, Twitter or the like; cloud storage services such as Dropbox; instant messaging services such as MMS or Apple iMessage; or other web services, such as color preference server 100A (described further hereinbelow).

Figure 1B:
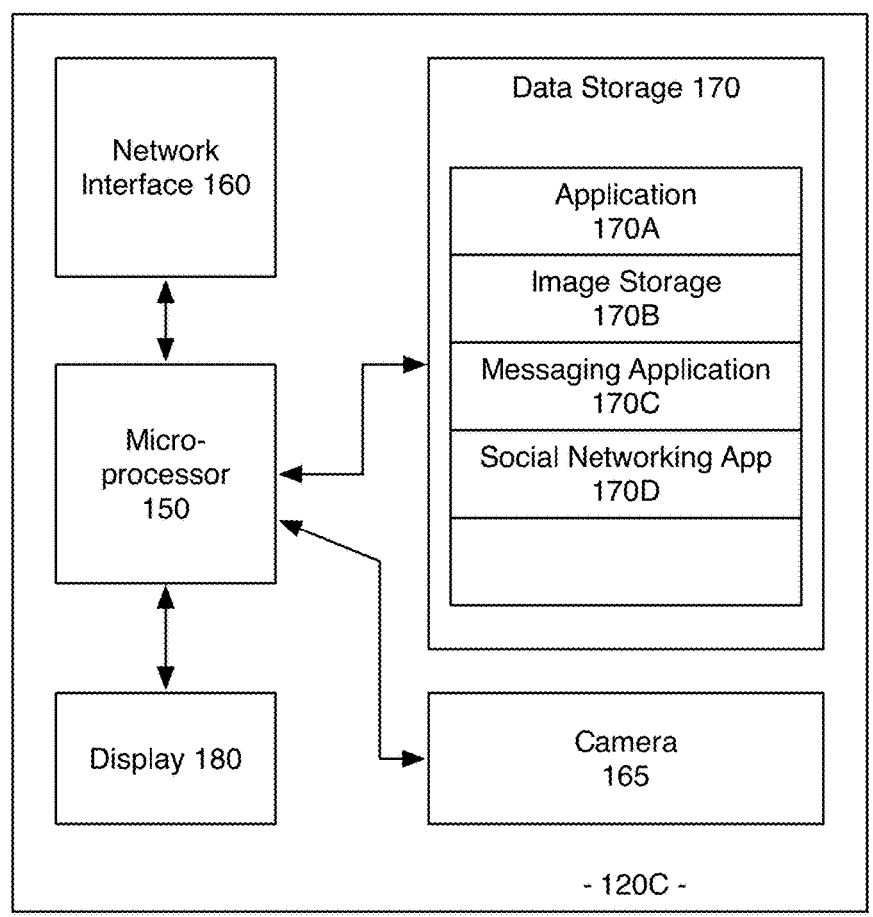
FIG. 1B is a schematic block diagram of a mobile computing device.

FIG. 1B is a schematic block diagram of an exemplary user device, smart phone 120C. Smart phone 120C includes microprocessor 150. Microprocessor 150 is configured to transfer data back and forth with data storage 170. Data storage 170 includes, inter alia, text overlay and stylization application 170A, image storage 170B, messaging application 170C and social networking application 170D. Device 120C further includes digital camera 165. Network interface 160 enables data communications with external networks, and may include common communication mechanisms including a cellular modem, Bluetooth interface and/or wireless Ethernet interface. Touchscreen display 180 enables user interaction with device 120C.

Figure 2:
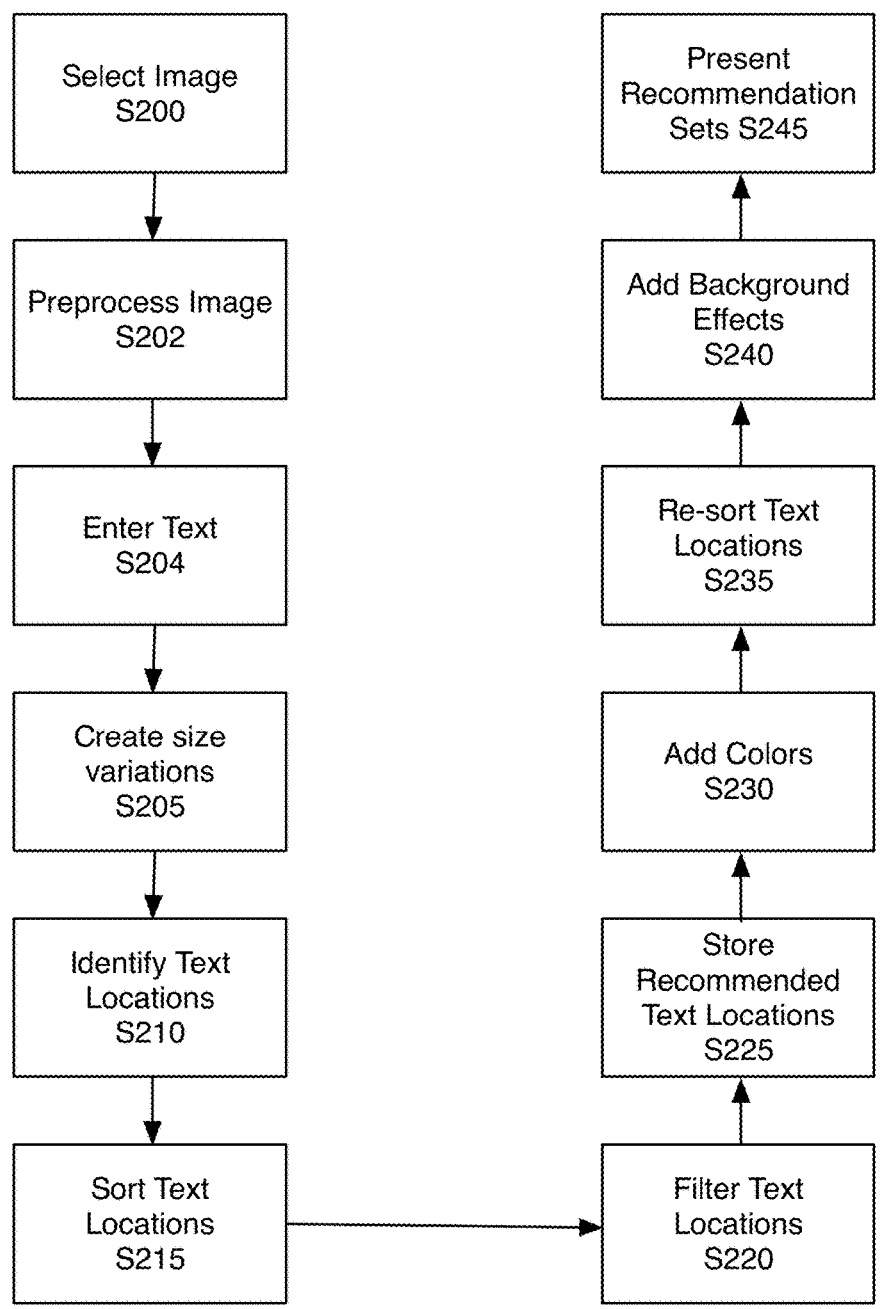
FIGS. 2-4 are flowcharts of processes.
Figure 5:
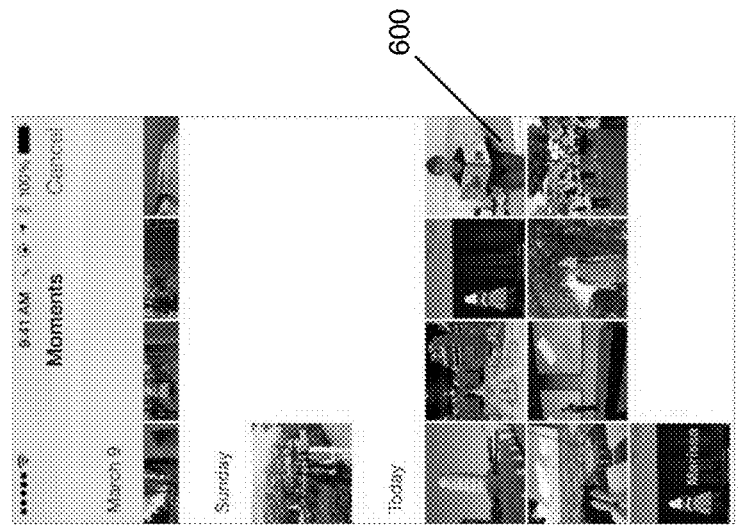

In accordance with an embodiment, FIG. 2 illustrates a process that can be implemented by user device 120. In step S200, a user interacts with device 120C to select an image previously stored by the device in image storage 170B, which the user would like to annotate with text. FIG. 5 illustrates a smart phone application user interface that can be rendered on display 180 for selection of an image in step S200 from the device's photo or image gallery.

Figure 3:
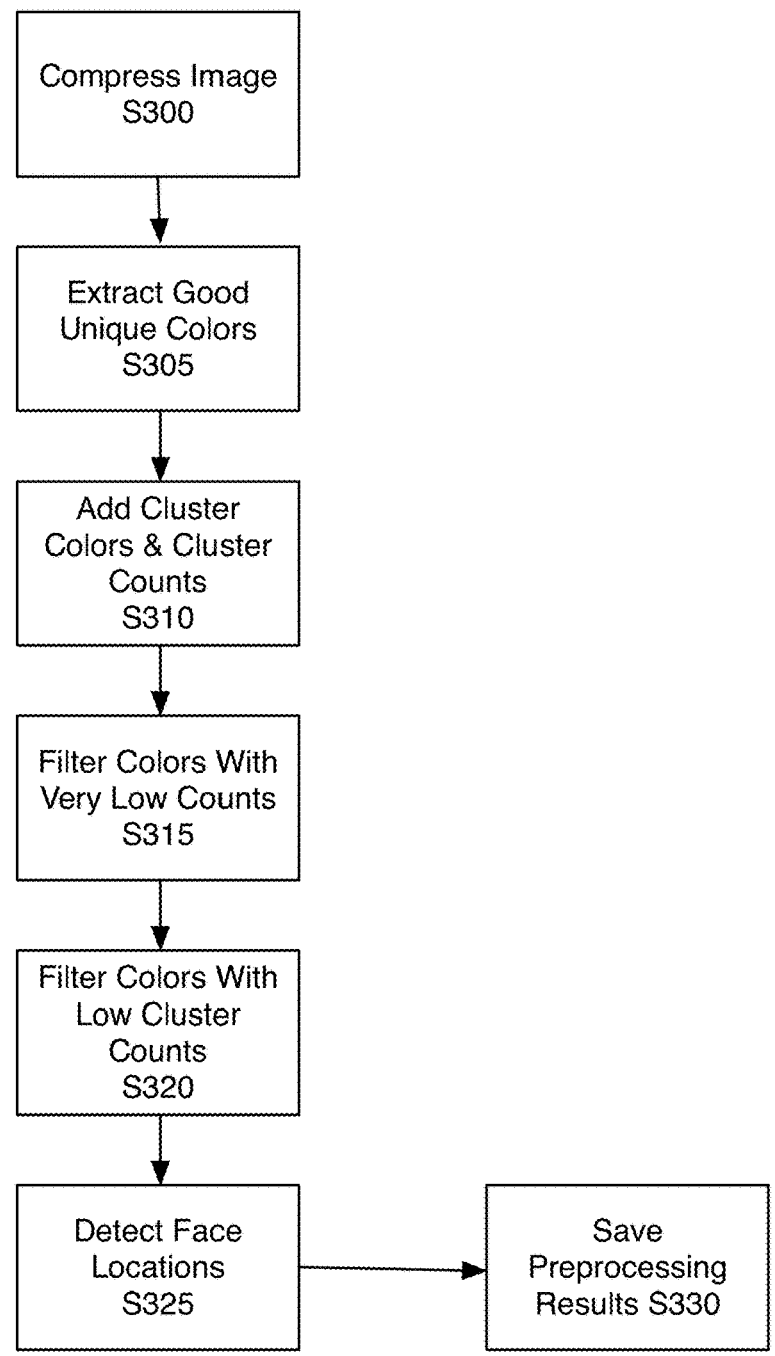

In step S202, user device 120 executes the application in order to preprocess the image selected in step S200. FIG. 3 illustrates an exemplary technique for image preprocessing of step S202. In step S300, the image is compressed into a lower resolution image and saved in memory 170 for later use. Preferably, an adaptive compression process is implemented in step S300. In some embodiments, the amount of compression can be varied based on the target device and the more compressed the image is, the faster the MAGICAL algorithm will run but with less fidelity and appealing results. The compression stage is optional based on the power of the computing device relative to the size of the image. Thus, high-powered computing devices such as personal computer 120A may decline to perform any compression in step S300. Tablet 120B may perform low compression in step S300, while smart phone 120C may perform high compression, thereby enabling each device to perform subsequent steps quickly, without undesirable levels of processing time or user interface lag, and without unduly consuming battery power for battery-powered devices 120.

In step S305, all unique colors are extracted from the compressed image by examining each of its pixels. The count of the number of occurrences of each unique color is stored for later use. Preferably, undesirable colors are filtered out. The colors removed include those with low saturation (grayish or almost grayish colors), low brightness including blackish colors and very bright, low saturation colors that are almost whitish. In addition, dirty yellow and brownish colors can be removed. Other colors can be removed including those the user has specified as being undesirable in a user-specific preference, colors that similar users have specified as being undesirable or colors specified by other users as a whole as being undesirable. Undesirable colors can also be inferred from a specific user, similar users or users as a whole.

In some embodiments, it may be desirable to further filter the unique color set by deduplicating colors that are highly similar to one another. For example, in an embodiment operating in an 8-bit RGB color space where each of the red, green and blue channels is expressed in a range of zero to 255, it may be desirable to combine colors within a range of +/−4 or 8 in each of the red, green and blue channels. Through such an operation, colors with imperceptible or barely perceptible differences are considered to be the same color, potentially greatly reducing the number of unique colors for further processing and evaluation.

In step S310, the application adds cluster colors and determines cluster counts. Specifically, each remaining unique color after step S305 is then analyzed to see how many other unique colors are near it. These nearby colors are referred to as its cluster colors.

A color is determined not to be nearby to the comparison color if their minimum perceived brightness difference is greater than a threshold amount or the perceived color distance is greater than a threshold amount or the colors are non-adjacent. Colors that are non-adjacent are those that, when mapped into a color wheel, are in neither the same slice as the subject color nor an adjacent slice. Colors that meet these criteria are said to be "distinct" and colors that do not are said to be "clustered".

Luminance or perceived brightness is preferably calculated using a formula that takes into account the human physiology of the eye, which perceives green as the brightest, then red as the second brightest, and blue as the least bright, for a given level of actual light energy. Since images are typically stored with non-linear gamma correction, the input is first inverse gamma corrected. Then, the perceived brightness is calculated. Finally, the calculated perceived brightness value is gamma corrected. While some existing image- and color-processing systems rely upon the W3C algorithm for determining luminance, that algorithm may lead to inaccurate or otherwise undesirable results for many colors and in many circumstances, especially for shades of yellow. Other systems refer to the 1976 C.I.E. u'v' and CIE L*u*v* approaches, but this can also produce undesirable errors and its modified version does not perform well in the range of pink colors. Thus, for images in an sRGB color space, it may be desirable to utilize an algorithm as follows: Inverse Gamma, apply Coefficients, Apply Gamma; using coefficients as follows: R: 0.212655, G: 0.715158, B: 0.072187. Gamma for sRGB is a composite function that approximates exponentiation by 1/2.2.

Color distance can be calculated by taking the RGB (Red, Green and Blue) values of the two colors being compared and calculating a linear distance between them. That linear distance can then be used to approximate how differently the human eye perceives the two colors. While numerous formula can be effectively utilized, in an exemplary embodiment determining the distance between colors C1 and C2, a calculation combines weighted Euclidean distance functions, where the weight factors depend on the magnitude of the red component of the RGB color, as follows:

$$\bar{r} = \frac{C_{1,R} + C_{2,R}}{2}$$

$$\Delta R = C_{1,R} - C_{2,R}$$

$$\Delta G = C_{1,G} - C_{2,G}$$

$$\Delta B = C_{1,B} - C_{2,B}$$

$$\Delta C = \sqrt{\left(2 + \frac{\bar{r}}{256}\right) \times \Delta R^2 + 4 \times \Delta G^2 + \left(2 + \frac{255 - \bar{r}}{256}\right) \times \Delta B^2}$$

Each color that is near it as defined above is added to its color cluster. The cluster count for each color is then calculated by summing the counts of the number of occurrences of each color in the cluster.

In step S315, the application filters out colors with very low count so outlier pixels are not used as possible text colors. In step S320, colors with low cluster counts are also filtered. This will result in colors which only appear for a very small portion of the image to not be used and colors that are easily perceived by the human eye in the photo being retained. For example, the color of a person's piece of clothing might have a color, such as a shade of green, which would be retained.

In step S325, a face detection algorithm, known in the art, is run on the image and the X/Y coordinates, width and height of all faces detected are then stored for later use.

In step S330, the final global list of "good" filtered unique colors along with each colors count, cluster colors and cluster color counts is saved for later use, as well as the results of the face detection algorithm.

Figure 6:
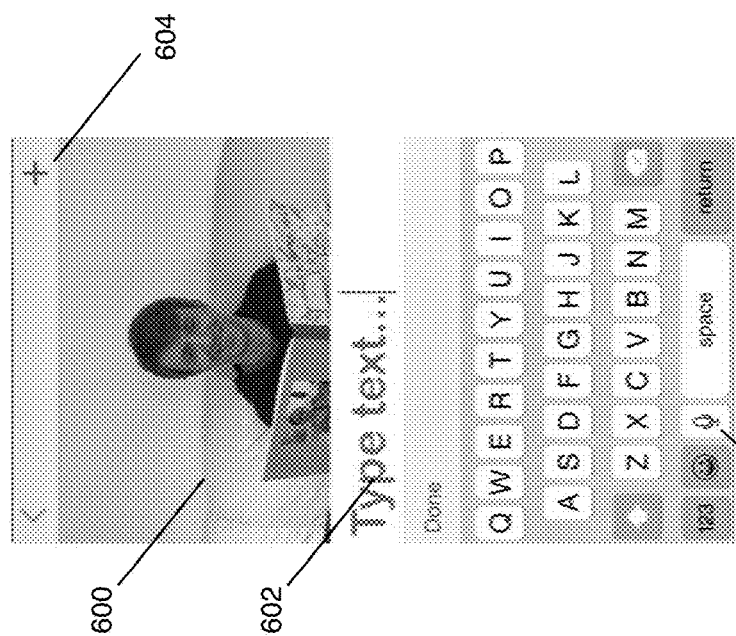

In step S204, the user enters text for overlay on the selected image. FIG. 6 illustrates a user interface for implementation of step S204. Some or all of selected image 600 is rendered on device display 180. Text entry field 602 enables entry of desired text content intended for overlay on image 600 utilizing the on screen keyboard illustrated in FIG. 6. Alternatively, selection of microphone icon 606 triggers a speech-to-text functionality, via which a user can speak verbiage into a user device audio transducer for digitization, electronic transcription and automated placement and stylization of corresponding text content on an image. In other embodiments, it is contemplated that voice input can be solicited from a user directly by a user device application, whether by affirmative prompting or display of a prominent user interface element for triggering a speech-to-text conversion operation. In such embodiments, it may be desirable to enable a user to trigger other functions described herein via voice prompt, such as text placement and/or stylization adjustments, and/or sending of the image with text overlay via email, SMS, social network sharing, cloud file storage or other mechanisms.

Default text can be provided in the text field before the user starts typing and can consist of, inter alia: the last text the user typed; a list from which to choose of the most recent texts the user typed; the date (whether current date or determined by date meta data associated with the image); or a location. For automated population of location information, location may be based a user's current position at the time of step S204, such as might be extracted using GPS or other device location services. Alternatively, location information could be extracted from meta data associated with the image file. Location may be rendered into text in different ways, such as city and state, points of interest (e.g. "Hapkuna Beach, Kona"), addresses, businesses associated with a particular location, or the like.

Other examples of default text include text selectable from a list of common messages. This list can be predefined or taken from the list of top text phrases sent by the application or service. A list of common greetings may be provided; which list may be context-determined based on time and date (e.g. the list may include "Happy New Year" for users located in English-speaking countries performing step S204 on or around December 31st).

Default text options may also be determined based on automated analysis of image content. For example, some individuals utilize photo applications that implement facial recognition algorithms, such that the identity of individuals in a photo can be looked up and associated with the photo. In such an environment, default text may be presented corresponding to the names of one or more individuals identified in a photo using facial recognition.

Information such as date, location and names can also be automatically added to the image without prompting the user or in addition to the text the user types.

Figure 23:
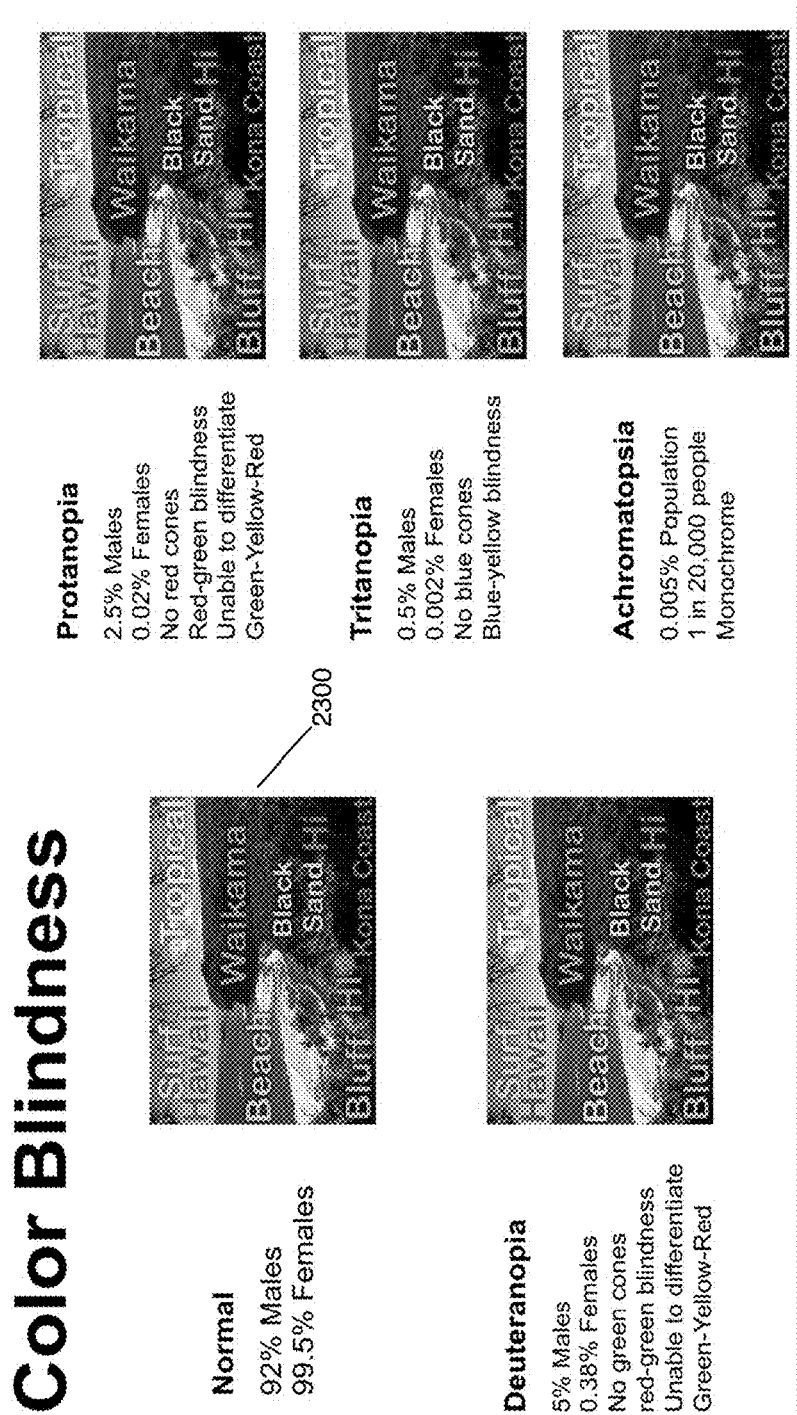
FIG. 23 is a rendering of text overlay results as perceived by individuals with common visual disabilities.

Plus icon 604 enables creation of additional text overlays on image 600. Each text component can be positioned and stylized, as described herein. FIG. 23 illustrates an exemplary image in which multiple text overlays have been added to an image 2300, each being positioned, colored and stylized as described herein.

This text message entered in step S204 may contain multiple words that can be multiple lines of text. If the user does not enter new line returns, the program will wrap the text message into multiple lines to ensure the text is not wider than the image or that fits within a specific part of the image.

Preferably, as the user types their text message into text entry field 602, the application rendering the user interface of FIG. 6 automatically starts shrinking the font when the text reaches the end of the first line, allowing the user to fit more text on a single line. It shrinks further when reaching the end of the second and third lines, thereby providing text stylization adaptive to the total amount of text entered by the user such that shorter messages can be displayed in large, easily readable fonts, while still enabling the entry of longer messages into text field 602 for overlay on the image. Otherwise, the text would quickly fill up a large portion of the image.

Once the user has entered the text, in step S205 the application creates additional size variations of the text to input into the layout and coloring algorithm. The first variation is: if the text is less than or equal to one line, then the application will also divide the text into two lines. The application will also evaluate one-line and multi-line layouts using a smaller font as well, which may fit better into a specific region of the image that is favorable for text overlay, e.g., light, dark or smooth.

The width, height, font size and number of newlines for each of these text regions are then input into the layout and coloring systems. These systems are sometimes referred to as the Machine Automated Graphical Image Coloring and Layout (MAGICAL) system or algorithm, certain embodiments of which are generally described as follows. The MAGICAL system returns a list of optimal text locations for the text region sorted from best (i.e. highest scoring) locations, to slightly less desirable (i.e. somewhat lower scoring) locations. Moderate and low scoring text locations are preferably not returned by default. Each text location may include text x and y coordinates on the image, text width and height, font size and number of new lines. Each text location may also include a sorted list of preferred text colors associated with that text location, and a recommended background effect for that text location (or none). The application takes the results of the MAGICAL algorithm and places the text in the best, highest scoring, text location. It uses the best, highest scoring color for that text location by default and applies the recommended background effect.

The application shows all the colors on screen that were returned for that text location so the user can select a different color with a single tap. In addition, for the color currently selected all of the cluster colors (described later) are displayed and can be chosen with a single tap on the screen as well. The user can change the background effects such as glow, shadow and shading, all of which enhance the readability of the text. Each of these effects may use a grayscale shade from white to black or the average background color, usually made lighter or darker to increase the contrast with the text and help the text standout. The use of a background effect allows the text to be readable even on a noisy background where it would not be easily readable otherwise.

The application also allows the user to select the next highest scoring text location and its colors. The user may thus cycle through all the text locations returned. The application may preview all the best text locations either sequentially or simultaneously. The user can change the size of the text box bounding the text, preferably via both a pinch-to-user user interface mechanism as well as + and − icons. The text is automatically resized to fill as much of the text box as possible, while respecting user entered line breaks. Typically, the text box is expanded or contracted proportionally in the X and Y axes. The user can change the font of the text. The user may edit the existing text or move it by dragging it. After the user is finished editing or moving the text, new text colors are calculated based on the new background region and the text is changed to the new default color. This will also happen if the user changes the font style, size or contents of the text. The user may add additional text messages to the photo, which will also use the MAGICAL algorithm to determine the best location and colors and not overlap with any previous text if space permits. The user may also save the image with the text rendered onto it to the phones image library, upload it to a server, such as Dropbox, or open a messaging application such as Twitter, Instagram, Facebook Messenger, Whatsapp, with the text already incorporated into the image. The user may post the photo an existing feed, such as Reddit or one specific to the application, that is private, shared with another individual, shared with a group, shared with an organization or public. The user may also select a new photo and add text to that without leaving the application.

The user may set preferences which include:

a. The style of foreground color: best overall match that balances the best looking color with color frequency within the image, best looking color relative to the image and the texts background, most common color in the image (dominant color), secondary color, tertiary color, best of secondary, tertiary or 4th best color, most vivid or grunge (darker and lower saturation)

b. Number of text locations returned c. Resolution/speed tradeoff

Returning to the embodiment of FIG. 2, once the user has entered the text and its various possible regions (width, height, font size and new lines) then the text location identification portion of the MAGICAL algorithm is run. The following steps are performed to calculate the recommended text locations. Returning to the process of FIG. 2, in step S210, for each possible text region size, and for every candidate text location in the compressed image, a Text Location Score is calculated. In some embodiments, the score is calculated from one or more of the following variables:

Color similarity. This is a measurement of how similar all the pixels in the potential text location region are relative to the average background color of that region. Thus a solid blue sky could be much more similar than an area containing cars and buildings. In some embodiments, the color similarity can be calculated by first calculating the average background color of the entire text location and then summing the color distance between each pixel's color in that region and the average background color. Then it is subtracted from and divided by the maximum similarity value. Thus, the more similar the pixels are to the average background color, the higher this value will be. Preferably, we use the color distance as the basis for this calculation because it is more precise than using a greyscale difference.

Perceived brightness strength. This reflects how light or dark the average background color is relative to a middle grey tone. Text location regions with particularly light or dark average background color will have a higher perceived brightness strength than regions having predominantly medium-intensity perceived brightness.

Text region size. The larger the text region is, the higher this value will be. This can be approximated by using the font size. This is included because the smaller text regions resulting from a smaller font size will generate higher color similarity and brightness strength values so this counteracts that.

Centered bonus. A bonus is given if the text is centered horizontally within the image as that is typically considered to be more symmetrically pleasing to the human eye.

Extra pixel width. The equal number of pixels to either side of the text region that are similar (i.e. above a similarity threshold value) to the average background color of the text location region. For example, if the value was 3 then three pixels on the left and 3 pixels on the right would be similar to the average background color of the text location region. At least one of the pixels that was four pixels to the left or right would not be similar. This variable enables text to be horizontally centered in regions whose color is similar to that of the average background color of the text location. For example, within a white cloud on a blue sky.

Extra pixels high. The equal number of pixels above and below the text region that are above a certain color similarity threshold allowing the application to vertically center the text within the surrounding image area where the image color is similar to the area where the text is.

Covers face. A penalty if the text region obscures part of a face detected in the preprocessing phase.

Edges detected. Optionally, a penalty is applied if an edge is detected within the text location region. An edge is defined as a location where the perceived brightness changes sharply or has discontinuities. The penalty would be proportional to the magnitude of the edge.

Blur. A bonus can be applied if a portion of the image proximate the caption location is blurry.

While the above variables can be effectively utilized to score potential text locations in step S210, it is contemplated that other variables can be added to extend this formula, or some of these variables may be removed or modified, e.g. to simplify the calculation. Regardless, all of the variables are preferably weighted. Optimal weights can be determined manually through experimentation to achieve desired outcomes. Alternatively, variable weights can be optimized by feeding back final location selections to a machine learning component, such that the machine learning component enhances prediction of user location preferences. Such a machine learning component may implement techniques such as Naïve Bayes, Support Vector Machines, Neural Networks or Random Forests, to which a training set with known good outputs is provided. In some embodiments, the machine learning component will be implemented by user device 120 and application 170A. In other embodiments, the machine learning component may be implemented remotely, such as by preference server 100A.

In step S215, text locations are sorted from highest text location score to lowest, based on the scoring in step S210.

In step S220, text locations are filtered so that the best non-overlapping text locations can be selected for presentation to the user. Specifically, the highest scoring text location is added to a list of recommended text locations. Subsequent text locations are added to the recommended text locations list, unless they overlap with another recommended text location within a bounded box defined as a predetermined number of extra pixels wide and high. This filter can be relaxed to allow partial overlap with already-selected text locations.

Preferably, each subsequent text location added to the recommended text location list must have a score that exceeds a predefined threshold, thereby eliminating the automated suggestion of poor text locations. However, this threshold filter is optional, and it is contemplated that in other embodiments the location score threshold filter may be conditional or eliminated.

In some embodiments, a maximum threshold for the number of recommended text locations may be configured, such that additional locations are ignored and discarded. In other embodiments, all recommended text locations can be returned.

Some users may require a text location that is generally horizontally centered in the upper region of the image. Therefore, preferably, the highest scoring text location that is horizontally centered in the upper region of the image will be added to the recommended text locations list.

In addition, preferably, a text location that is horizontally centered at the very top of the image will be selected as a recommended location, with a background effect of a solid bar of color that spans the entire width of the image. The color of the solid bar will be the most dominant color of the portion of the image appearing just below the solid bar. Variations on the background color can be a lighter or darker background color from the selected color's cluster or the best looking color from the cluster based on the Color Contrast Score. FIG. 18 illustrates such an embodiment. In some embodiments, fine grained adjustment such as further centering of the text can also be performed. This typically uses a higher resolution image, if available, and is optional.

In step S225, recommended text locations are stored.

In step S230, color options are added. The best text or foreground colors are added to each of the recommended text locations with the following steps, illustrated in FIG. 4:

In step S400, the text location color list is initialized using a copy of the final global list of filtered unique colors from the preprocessing step.

In step S405, for each color, it is compared to its cluster colors and if any of the cluster colors is better according to the Color Contrast Score, as described below, then the best of the cluster colors is used to replace it for that text location. The best colors can be limited to ones that occur a minimum number of times to help avoid outliers. In addition, optionally the average color can be used although this will typically not produce results that are as pleasing to the human eye or as readable. Below is a list of steps for a preferred embodiment, understanding that in other embodiments, they may be executed in a different order, some could be omitted for simplification, and/or additional steps can be added.

In an exemplary embodiment, the Color Contrast Score algorithm calculates a score based on the following variables:

Color distance—between the foreground color and average background color of the text location. This provides more precise results than just using grayscale.

Perceived brightness bonus. The perceived brightness bonus is based on the difference between an optimal foreground color perceived brightness and the actual perceived brightness of a foreground color under consideration. The optimal foreground color perceived brightness is calculated based on the foreground and background colors. The optimal perceived brightness is subjective, but preferably takes into account optimal readability while not over contrasting the foreground color with the background color. In an exemplary embodiment, the optimal perceived brightness starts with a baseline brightness difference of approximately 50% for white and black backgrounds, and shrinks to a lesser difference as the background value approaches medium gray. The closer the foreground color perceived brightness is to the optimal brightness, the higher the bonus.

Hue bonus. The hue bonus is made up of several factors. One factor in the hue bonus is color preference. Color preference criteria may be based on a population's statistical color preferences. The color preference may be specific to a user and determined either explicitly from a user's previously-stated color preferences, or implicitly from observing the user's behavior in choosing colors. This bonus can be automatically customized to individual user preferences based on a user's explicit preferences they enter or from inferring user preferences based on observing the users behavior, similar users behavior or all users behavior.

Bad colors and color combination penalty. For example, in some embodiments, skin color can be penalized as generally being an undesirable color for text and/or being likely to conflict with common photo content.

Color blindness penalty for colors and color combinations that appear degraded for color blind people. For example red on dark colors or red on green. Again this can be customized to the individual user in a similar manner as described elsewhere herein by aggregating interactions of a particular user with the application, and/or aggregating interactions across multiple users.

Same or adjacent color penalty. Foreground colors that are the same or adjacent hue to background colors in a color wheel typically have a lower contrast. In the exemplary embodiment, the color wheel divides potential hues into 8 colors (yellow, orange, green, light blue, blue, purple, pink, and red) for purposes of determining adjacency. Preferably, color wheels of 6 or more hues can be used effectively for this purpose.

Warm and cold colors bonus or penalty. Warm on cold colors typically contrast quite well and are pleasing to the human eye. Cold colors on a warm background also have higher contrast although not as good as warm on cold. If either of these criteria are met a bonus is applied and if it is cold on cold or warm on warm a penalty is applied.

An optional penalty if the color is the dominant color in an image, and optional bonus if the color is the secondary or tertiary color or color cluster based on frequency appearing the image.

Saturation bonus. Well-saturated colors are more vivid and often more pleasing to the human eye. The magnitude of this bonus preferably increases as saturation increases until a point where the saturation is optimal, at which point the bonus starts decreasing to prevent selecting over saturated colors. Selecting the highest saturated color in many cases will result in selecting an oversaturated color that will be visually unappealing and not be harmonious with the image.

Cluster count bonus. A bonus based on the cluster color count for that color. This gives colors that appear more and are more harmonious to the image to have a higher bonus.

In step S410, potential text color selections can be boosted to further enhance appearance. To boost (enhance) a foreground color we increase or decrease its saturation, brightness and/or contrast to be closer to the optimal saturation, brightness or contrast. Preferably, color parameters are boosted by an amount such that the color still closely resembles the original color but looks more visually appealing to a user. Alternatively or additionally, the color can be boosted by an amount such that it is more likely to contrast well with the background color (e.g. exceeding a contrast threshold level). For example, if a light color is close in brightness to an even lighter average background, it may be desirable to boost the color noticeably to significantly increase contrast and saturation. If the difference between a candidate text color and average background color is sufficient but not optimal, it may be desirable to boost the candidate text color more modestly to subtly improve its appearance without appearing oversaturated or excessively contrasty.

In step S415, all colors in the text location color list are filtered so only colors that sufficiently contrast with the average background color are returned. The level of contrast is determined by ensuring the colors meet a minimum perceived difference and minimum color distance. This value can be adjusted by the user, based on user preference or on the preferences of receiver by checking via a server API. For example, if you know you are sending it to a grandparent who is visually impaired you may choose to increase the default color contrast so it will be more readable for them.

In step S420, the application sorts all remaining colors based on the Color Contrast Score. This will ensure colors that have the best contrast and are the most readable and harmonious are ranked highest.

In step S425, non-distinct colors are filtered out by starting with the current sorted list of text location colors and checking to ensure that each color is "distinct" (as described above) from its previous colors in the list or else remove it. This step serves to reduce the number of color options presented to the user to simplify the user's evaluation of candidate colors, while still presenting the highest-scoring option amongst each set of similar colors. If the first text/foreground color is the same or an adjacent hue to the background then it can be moved down in the sorted list of text location colors. This is repeated until the first color is not the same hue as the average background color or until all remaining text location colors are checked, whichever comes first.

In step S430, the application sorts cluster colors by brightness, Color Contrast Score or color cluster count.

In step S435, one or more predefined colors are added to the list of potential text location colors. In the illustrated embodiment, predefined colors for each of 10 hues are added to the end of the text location colors that are "distinct" (as described above) from the existing text location colors. In addition, distinct cluster colors of the same hue but varying saturation and brightness are assigned to each of these predefined colors clusters. The user is allowed to choose from these cluster colors as well in the applications user interface. If no foreground colors remain based on the above-described filtering and qualification criteria, then the first predefined color will be used. This can be determined by sorting with the Color Contrast Score.

In step S440, a new total color score is calculated that is the sum of the original text location score and the Contrast Color Score of the first (highest scoring) color for the text location and a bonus for the colors frequency in the image.

In step S445, we return a list of recommended colors for the text location.

Returning to FIG. 2, once the sorted list of colors has been added to each text location, the text locations are sorted by the total score (step S235). In step S240, background effects may be added to one or more of the candidate text location and color combinations. Each remaining text location is analyzed to determine if a background effect should be added to increase the text's visibility and what type of background effect. The color similarity along with the perceived brightness difference and color distance between the first foreground color and average background color are examined to determine if a background effect is desired.

Figures 15, 16:
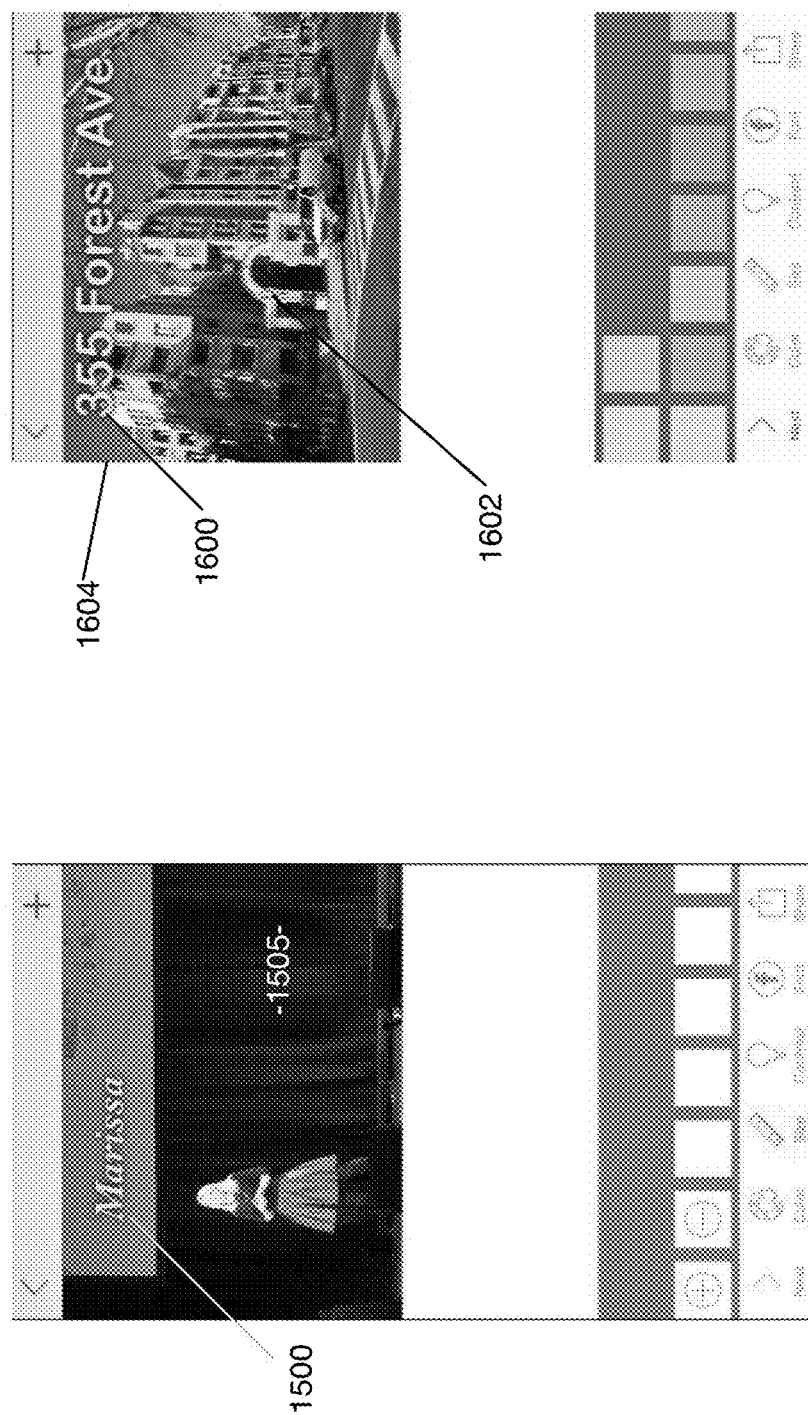

One or more different background effects can be applied. Preferably, background effects include a glow using either grayscale or the average background color, usually darkened or lightened around the text to increase contrast. This also suppresses background noise from the image behind the text. For example, FIG. 16 illustrates an exemplary embodiment in which a background effect has been applied. Specifically, a darkened glow function has been applied surrounding text 1600. The color of text 1600 was extracted from traffic sign 1602, and contrasts well against the blue sky in image 1604 in FIG. 16. However, the background effect helps differentiate the characters "355" from the underlying "noisy" background image of the building, which has numerous small and high-contrast features (windows, window sills, building corners) in a color that contrasts less from the bright yellow text.

Another potential background effects include darkening or brightening the entirety of a text location region (such as a rectangular area underlying the text extending across the width of the image). FIG. 19 illustrates such an embodiment. Another potential background effect is application of a drop shadow. Another potential background effect is application of an averaging or Gaussian blur function underlying the text region, as illustrated in FIG. 21. Another potential background effect is replacement of the area underlying a text region with an average color determined based on, e.g., the totality of the image area being replaced; such an embodiment is illustrated in FIG. 18. FIG. 20 illustrates the text and image of the embodiment of FIGS. 18 and 19, without any background effect applied. FIG. 22 illustrates the same text and image, with a blur effect and contrast enhancement effects applied behind the text.

In addition to evaluating one or more background effects for application, a background effect intensity may also be determined and variably applied based on score. In some embodiments, background effects may be applied more heavily for text location and color combinations that suffer from, e.g. low foreground/background color contrast or high levels of "noise" in the background image. FIGS. 16 and 17 illustrate glow effects having different intensities.

Color options can then be presented to the user (step S245), preferably sorted in order of score. The highest scoring text location is assigned the default text location and its highest scoring color is the first default color.

FIGS. 5-19 illustrate exemplary user interfaces that may be rendered by the above-described application in accordance with various steps in its operation. FIG. 5 illustrates a user interface rendered on a mobile device for selection of a digital image for processing. FIG. 6 illustrates a user interface soliciting text content for the user for overlaying on a selected digital image.

Figure 7:
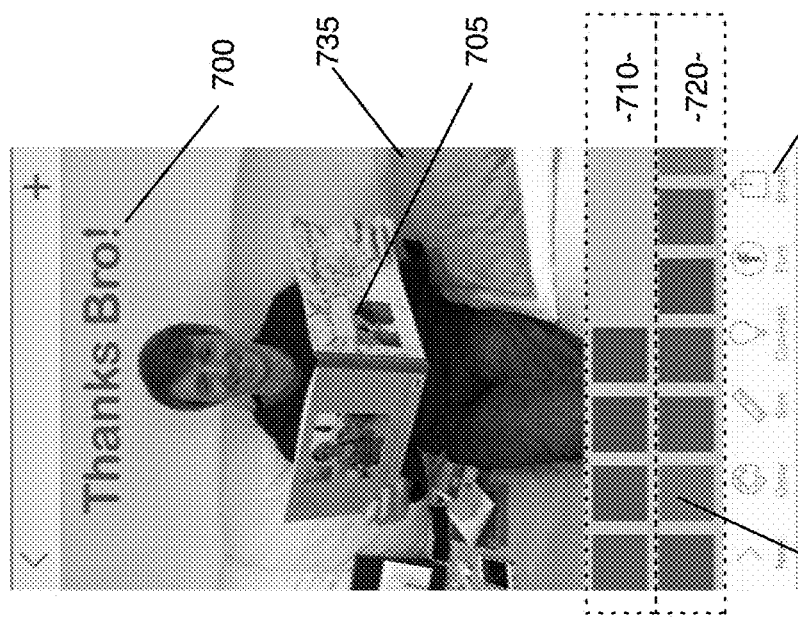

FIG. 7 illustrates an exemplary result of the systems, methods and techniques described herein, in which solicited text is overlaid on a selected digital image. Text content 700 is overlaid in a centralized position, on a portion of the image having relatively uniform content, rendered in a blue color that contrasts with the background at that text location and is present in the image elsewhere at location 705. Region 710 presents other variations of the selected blue color that are the cluster colors, and which can be readily selected for text content 700 by touching one of the region 710 color blocks associated with a desired color. Region 720 illustrates other preferred colors for the current text location, determined based on the technique of FIGS. 2-4.

Figure 8:
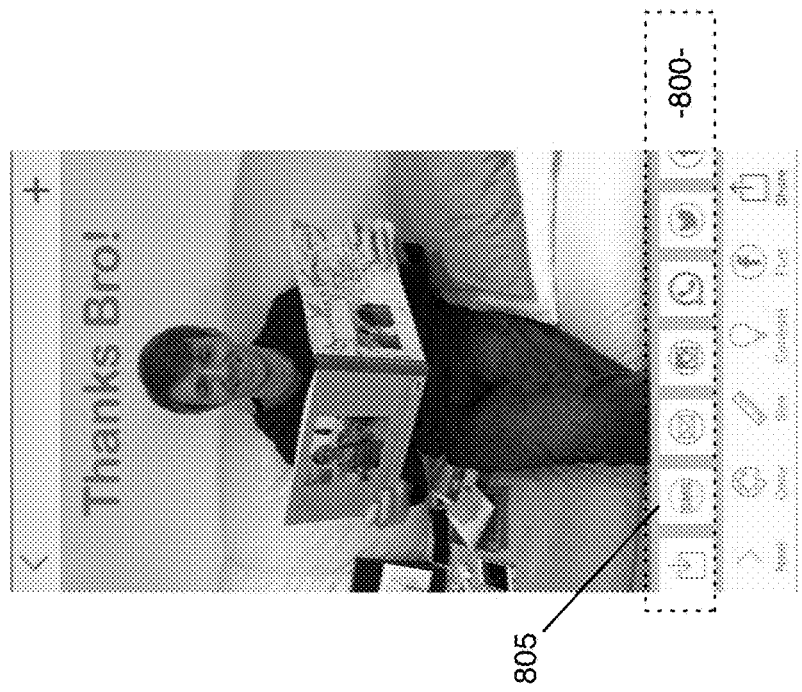

FIG. 8 illustrates the embodiment of FIG. 7, upon selection of color block 730, thereby rendering text content 700 in an orange tone identified in the underlying digital image at, e.g., location 735. Share option region 800 is displayed upon selection of share icon 740, and displays a plurality of services for automatically sharing the completed image with text overlay. For example, text messaging icon 805 can be selected to transmit the final image-with-text as a MMS text message, as illustrated in FIG. 9. The order of messaging applications can be changed to based on popularity, partner preference or if a partner pays for a preferred location. Alternatively, the built-in sharing functionality for the mobile device can be invoked when the user clicks on the share button. In the case of the Apple iPhone, this currently brings up a special sharing menu that shows all applications installed on the phone capable of sharing an image, including the built-in applications.

While FIG. 8 illustrates share options in which content created in user device application embodiments described herein can be shared via other messaging and communication applications, it is also contemplated and understood that embodiments of the text overlay and stylization systems described herein can be integrated with messaging and/or social networking applications such that the text overlay and stylization functionality can be invoked directly from another application. This type of operation can enable seamless workflow for users of third-party messaging and social networking applications. For example, some messaging and social networking services are built as platforms, enabling integration with third party services and applications using Software Development Kits and associated data interface points. In such an environment, a user of a messaging or social networking application may be provided with user interface elements enabling seamless interaction with third party applications, such as an array of icons or logos representative of third party applications. The selection of such an icon may launch an integration with, and provide for unidirectional and/or bidirectional transfer of data with, applications and/or systems such as a text overlay and stylization application and/or a color preference server, described elsewhere herein. Thus, in an exemplary operation, a user of a messaging application can select a photo within the environment of the messaging application and directly invoke the text overlay and stylization application, seamlessly passing or otherwise sharing image data associated with the photo from the messaging application to the text overlay and stylization application, and enabling the return of modified image data from the text overlay and stylization application back to the messaging application. In another exemplary operation, a user of a messaging platform can select a user interface element from a messaging application user interface, in order to retrieve image data from the text overlay and stylization applications described herein, thereby facilitating the seamless creation and import of images overlaid with text into the messaging application. These and/or other operations may be enabled using the systems and methods described herein.

Figure 4:
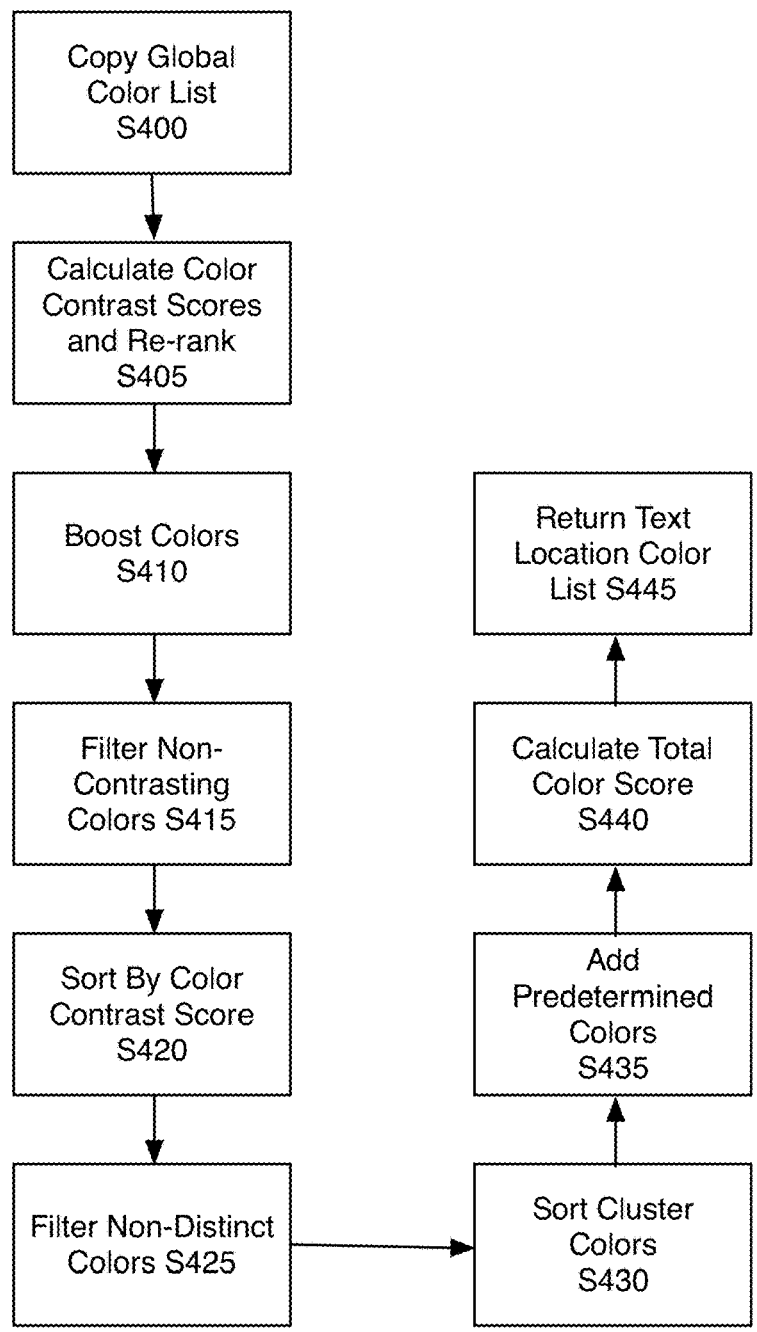

FIGS. 10-12 illustrate another aspect of functionality in which a user interface enables a user to view different text location and color combinations, as determined by the methods of FIGS. 2-4. FIG. 10 illustrates a first text location and color combination. FIG. 11 illustrates a second text location and color combination. FIG. 12 illustrates a third text location and color combination. A user can readily cycle through the overlay options of FIGS. 10-12 by selecting "Next" icon 1000.

Illustrated embodiments of the mobile device user interface also enable selection from amongst a plurality of font choices for the overlaid text. FIG. 13 illustrates such a font selection function. Selection of font icon 1300 initiates display of font selection palette 1305 containing a plurality of letter icons rendered in different fonts. Selection of one of icons 1305 causes overlaid text 1310 to be rendered in a font corresponding to the selected icon. In alternative embodiments, stylization parameters (including color and size) can be automatically re-determined upon selection of a new font. For example, the caption bounding text box size may be automatically adjusted to accommodate the size of a newly-selected font, and color recommendation(s) may be determined and applied in view of the new caption text box.

Illustrated embodiments of the mobile device user interface also enable user control over text size. FIG. 14 illustrates such a text size control mechanism. Selection of size icon 1400 initiates display of size controls 1405, selection of which causes the size of overlaid text 1410 to be increased or decreased.

Embodiments may also enable a user to manually control the size and positioning of text. For example, in the touch-screen mobile device embodiment of FIG. 15, a user can tap-and-drag text 1500 onto various locations within photograph 1505. In some embodiments, upon release of text 1500 in a new position, the system automatically executes methods and processes described hereinabove (such as the automated color selection processes of FIGS. 3 and 4) in order to change the default text color to an optimal color for the new, manually-selected text location. Thus, compared to the embodiment FIG. 14, in FIG. 15 the user has manually moved text 1500 to a new location, at which point the text color was automatically changed from the purple color of text 1410 (which would have exhibited poor color contrast relative to the background image content at the location of text 1500), to the yellow color of text 1500 (which exhibits good color contrast relative to the background image content at that location).

In some embodiments, modification of caption color and/or other stylization may be performed continuously or periodically, as a user is adjusting the caption position, rather than following release of the caption in a new position. For example, the process of FIG. 4 can be performed to identify and apply an optimal color to caption text, as the caption is being positioned on the underlying image, thereby providing a user with a view of real time or near-real time color recommendations throughout the repositioning process.

Figure 25:
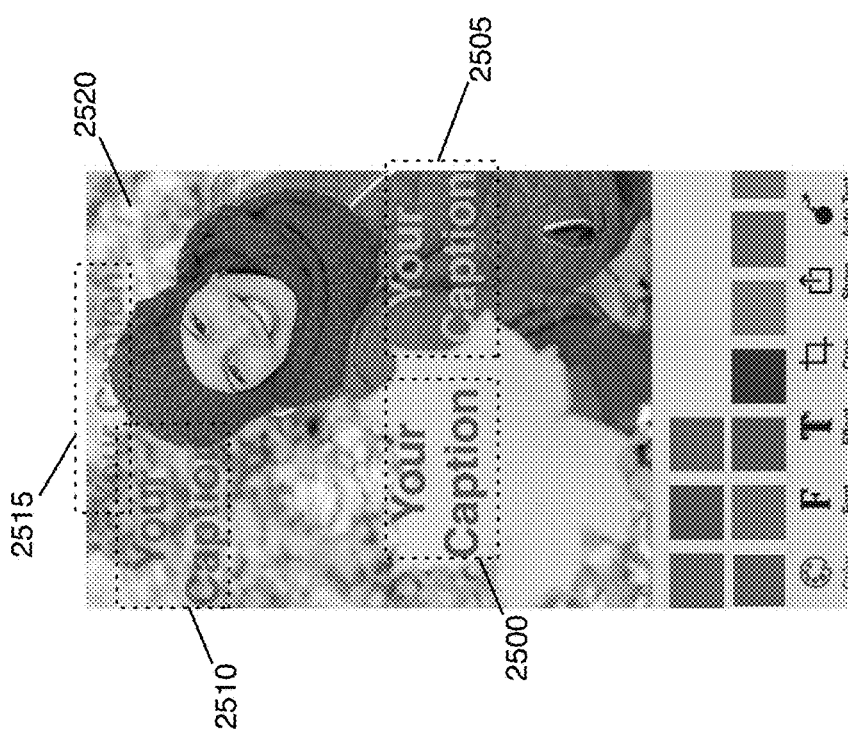

Other user guidance mechanisms can also be provided in connection with user repositioning of a caption. For example, in some embodiments, previews of recommended caption locations (e.g. one or more highest-scoring text locations determined in step S215) can be provided during a manual repositioning of the caption. FIG. 25 illustrates such an embodiment. Region 2500 illustrates a current caption position during a manual repositioning by the user. Once the repositioning is initiated (i.e. once the user begins dragging the caption to a new position), the top three alternative recommended caption positions 2505, 2510 and 2515 are illustrated overlaying image 2520, thereby providing the user with immediate visualization of potentially-pleasing caption positions. Preferably, the alternative caption position previews are also displayed in a color recommended for the location (e.g. via the process of FIG. 4). In order to help the user differentiate the current caption position from a recommended caption position, a visual cue may be provided. In the embodiment of FIG. 25, recommended caption position previews 2505, 2510 and 2515 are displayed with semi-transparency to help the user distinguish actual and potential positions. A location snap feature may also be provided, such that release of the caption in a position within a threshold distance of a recommended preview position may be interpreted as an attempt to move the caption to the recommended location, such that the caption is automatically repositioned at the nearby recommended location.

In some embodiments, the user can also manually adjust the size and orientation of text via touch gestures. The text is initially rendered within a bounding text box, with the text sized to fill as much of the text box as possible while respecting user-specified lines breaks within the text. User device 120 implements a pinch-to-zoom user interface mechanism via which a user can expand or contract the text box (preferably proportionally). Similarly, the text box rotation can simultaneously be controlled via a two-finger rotation gesture. Upon release of a user's touch gesture, the text is re-rendered at a size adjusted to fill as much of the resized text box as possible (while still respecting user-specified line breaks) and in an orientation realigned with the adjusted text box orientation.

In accordance with another aspect of the illustrated embodiment, a user can manually select a color from the underlying image for rendering of the overlaid text. For example, in the embodiment of FIG. 13, compared to the embodiment of FIG. 12, the user has manually tapped location 1315 (i.e. the dress of the individual illustrated in the underlying photograph), thereby causing the application to apply the purple tone at the selected location 1315 to the displayed rendering of text 1310.

FIG. 16 is a mobile device user interface embodiment in which a background effect has been applied to text 1600 to increase visual contrast relative to the underlying background image portion, as described further above. FIG. 17 illustrates controls presented by the exemplary mobile device user interface, enabling user control over background effect. Specifically, selection of contrast icon 1700 causes the device to render a plurality of background effect icons in region 1705, selection of which renders text 1710 with a different background effect. FIGS. 18 and 19 illustrate different background effects, as described further elsewhere herein.

FIG. 23 illustrates the effect of utilizing the above-described system for users having various typical visual impairments.

While several embodiments have been described herein in the context of overlaying text on images, it is contemplated and understood that the systems, processes and techniques described herein could also be applied to add text to video content or to a photo preview frame in a camera application. In such embodiments, one or more video frames can be analyzed analogously to the image content described above.

While particularly valuable for adding text to images in the context of mobile picture messaging and social media content contribution, the systems, methods and techniques described herein can also be beneficially used to create image-based slides for presentations.

In addition to implementation of the methods, systems and techniques described herein on a mobile phone, it is contemplated and understood that they may also be readily implemented on other computing devices, such as a personal computer, a tablet computer, a server, a workstation, smart glasses, augmented reality glasses, virtual reality goggles, smart watch or other electronic devices capable of data processing.

In some embodiments, aspects described herein, including the MAGICAL algorithm, may be beneficially implemented by a network-connected server, such as an Internet web service and/or an Internet-connected server interacting with other devices via an Application Programming Interface (API) or the like. Such an embodiment may be particularly beneficial for offloading computation load for portable electronic devices by enabling user input and other interactions from a portable device and its associated display screen, while utilizing a network-connected server for some or all of the image processing and other computations described herein. A network-connection server making functionality described herein available via API may also be provided to implement automated text-over-image overlay functionality as a service, for third party applications (including third party user device applications and/or web applications).

In some embodiments, it may be desirable to implement a batch processing mode, in which large volumes of images could be processed to automatically overlay associated text. Such batch operations could be implemented by any of a variety of system architectures, including standalone user devices, network-connected servers implementing APIs accessed by third party web services; or directly on servers. Use cases that may be particularly appropriate for batch processing could include, for example, the automated addition of text onto product images for an online shopping or e-commerce web site.

Automated Caption Optimization on Camera Preview Video or Other Video Content

Figure 26:
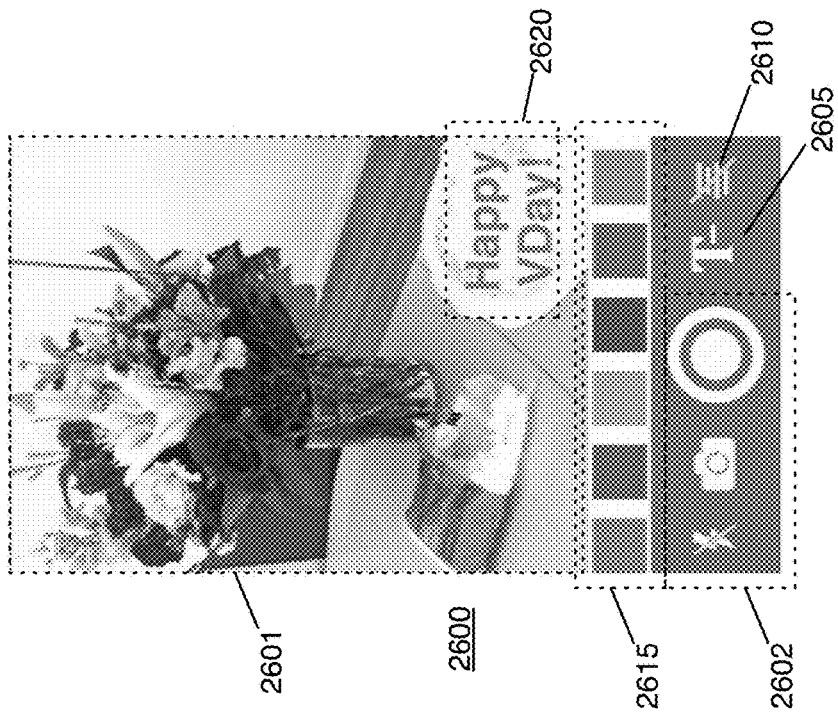
FIGS. 25-30 are user interface renderings of a smart phone camera preview video embodiment.

The systems and processes described herein for automated caption location, colorization and other stylization, can also be utilized in connection with a camera application, in order to provide live preview of a captioned image that may be captured by the camera. FIG. 26 illustrates a first user interface 2600 for such an embodiment, implemented on a smartphone having front and rear-facing cameras such as user device 120C. Region 2601 provides a live-motion preview of an image available for capture by camera 165. Region 2602 provides standard smartphone camera controls, including a flash control icon, a front/rear camera toggle, and a shutter button indicia. Selection of text indicia 2605 initiates a user interface mechanism by which a user can enter text content for rendering as a caption on a captured image, analogous to region 602 in FIG. 6.

Selection of text position indicia 2610 toggles between (a) a fixed-position mode, in which the caption is maintained in a fixed position while the camera viewfinder image is reframed; and (b) a dynamic positioning mode, in which above-described techniques are utilized to automatically reposition the caption (and potentially recolor the caption) to optimized positions (and potentially colors), based on the currently-framed image.

In other embodiments, a third text position mode can be provided, in which the text location is fixed (e.g., fixed coordinates for the text bounding box center point), but the size and line distribution of the text is dynamically adjusted based on a scoring mechanism such as that described in connection with FIG. 2. For example, given a fixed text position (such as centered towards the top of the frame, or centered towards the bottom of the frame), the size and line-break variation mechanism described in connection with step S205 can be applied for the fixed location, and scored as described in connection with steps S210 and S215, in order to identify an optimal text size and line-distribution for the desired caption and caption location.

Color pallet region 2615 displays color selection indicia corresponding to colors recommended for the caption, based on the currently-previewed image and caption location. In the embodiment of FIG. 26, the color selection indicia are small rectangular color swatches. Preferably, the colors displayed in pallet region 2615 adjust dynamically, as the live image sampled in the camera preview region 2601 is processed to identify optimal colors (as described elsewhere herein). Pallet region 2615 displays the highest-scoring colors, oriented from left to right in order of decreasing score. The left-most (highest scoring) color is automatically applied to the caption preview 2620. However, the caption color can be fixed to any of the colors in pallet region 2601 by tapping a desired color indicia within pallet region 2601. Upon tapping a desired color indicia, that color is applied to caption preview 2620 unless and until the color fixation is released. In some embodiments, the color fixation can be released by again tapping the same color indicia within pallet region 2601. Upon release of the color fixation, operation returns to dynamic color determination based on the caption location.

Figure 27:

As the camera is moved, the content of region 2601 changes to maintain a live preview of an image available for capture by the camera. FIG. 27 illustrates such a reframing of the image previewed in FIG. 26. The caption has been automatically repositioned to region 2700.

Figure 28:
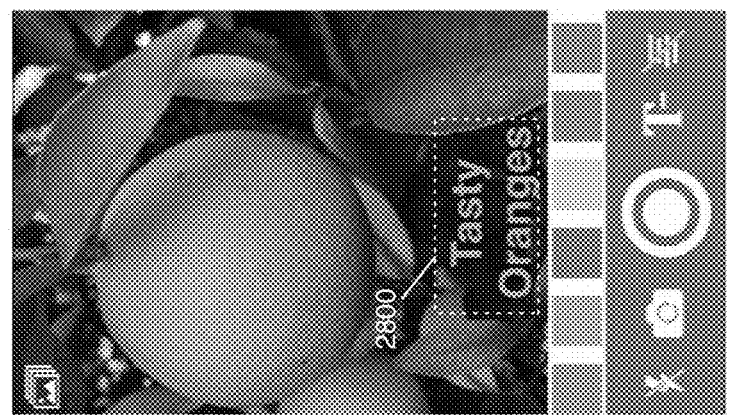
Figure 29:
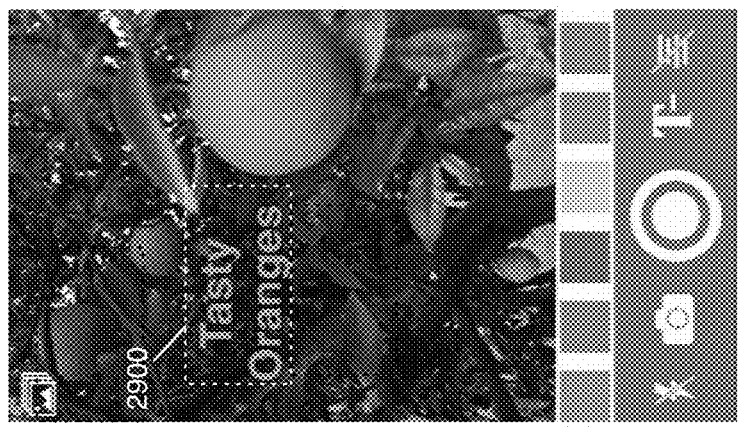

FIGS. 28 and 29 provide another example of a camera application having live captioning, where the caption location shifts as the subject image is reframed. In FIG. 28, a first image framing results in text captioning at preferred region 2800, while reframing of the image illustrated in FIG. 29 results in text captioning at preferred region 2900.

Figure 30:
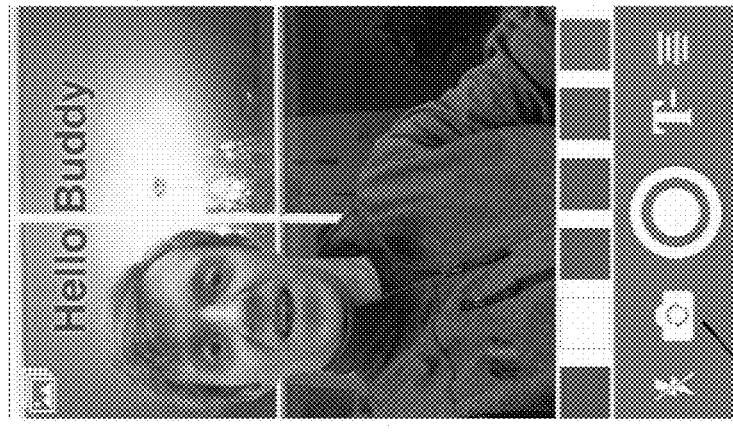

FIG. 30 illustrates a caption preview following actuation of camera toggle 3000, whereby a user can take a pre-captioned "selfie" photograph.

Application of automatic positioning, colorization and/or other stylization to video content (whether pre-recorded video content, live video content or video content serving as a viewfinder preview in a camera application) can be performed via several techniques. In some embodiments, frames can be periodically sampled from a video feed, with the processes described above (e.g. that of steps S210 to S235, and FIG. 4) applied to the sampled frame, and the caption displayed with an optimal recommended position and color. In some embodiments, the optimization mechanism applied to periodically-sampled video frames may also include scoring variations in font sizes for each location (e.g. one size larger and one size smaller), and/or variations in text line distribution (e.g. including all text on one line, and breaking the text over two lines).

However, the computation requirements inherent in rapidly performing caption location and coloration assessment may result in excessive power usage and/or reduced frame rates. Therefore, it may be desirable to implement techniques intended to reduce computational demands during video-based or video preview activities, such as a camera app viewfinder. For example, it may be desirable to deactivate face recognition features during a fast video preview mode, in order to reduce computational demand and accelerate the rate at which caption optimization can be performed.

Figure 31:
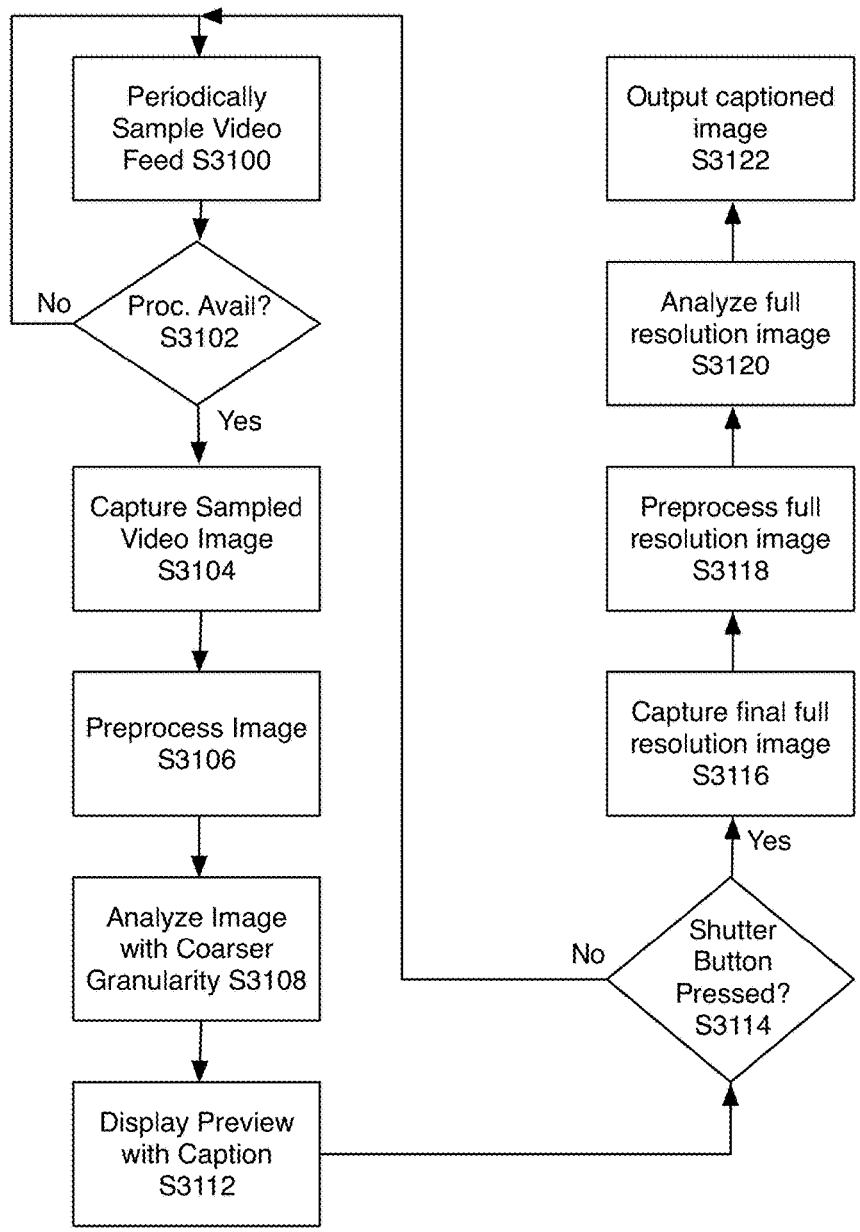
FIG. 31 is a process diagram for automated, dynamic caption positioning and coloration over a video feed.

Another such technique is illustrated in FIG. 31, and involves reducing the resolution of caption location option evaluation. In some embodiments, the process of FIG. 31 may be applied in circumstances in which caption text is entered ahead of time or otherwise predetermined. Other embodiments may provide user interface elements enabling entry and/or editing of caption text during the course of video preview. Regardless, in step S3100, the camera video feed is sampled periodically. In some embodiments, the video feed may be sampled at approximately 15 times per second. In step S3102, a determination is made as to whether the user device's processor has completed analysis of a prior frame and previewing of a stylized caption. If not, the most recently-sampled frame is discarded and another frame is sampled later (step S3100). If so, the most recently-sampled frame is captured and buffered for analysis by an optimization mechanism (step S3104). In step S3106, the buffered image is preprocessed, as described above in connection with step S202, except with coarser granularity of placement locations. For example, the resolution of potential placement locations can be reduced in half in both X and Y dimensions, in order to reduce computational demand by a factor of 4 times.

In step S3108, the buffered image is analyzed to identify an optimal caption appearance, such as location, color and/or other stylization attributes. In some embodiments, step S3108 can be implemented by performing steps S205 through S240 in the embodiment of FIG. 2. In step S3112, the video feed preview is displayed (e.g. on a smartphone display) having the user's entered caption overlaid thereon with the optimized location, color and/or other stylization determined in step S3108. In some embodiments, the display of step S3112 may include other elements, such as color palette 2615 of FIG. 26 displaying runner-up color swatches.

In step S3114, a determination is made as to whether the camera shutter button UI element was pressed. If not, operation continues with further sampling of the video stream, analysis of buffered video stream images and updating of attributes for the caption overlaid on the video stream preview. If the camera shutter button UI element is pressed, the camera switches from video preview mode to still image capture mode and a final image is captured (step S3116).

The final image is typically higher resolution than the buffered video preview frames (e.g. 8 times higher resolution in some embodiments). Therefore, it may be desirable to perform optimization of caption location, color, and possibly other stylization elements, using the final full-resolution image, in order to maximize the output quality. Subsequent operation can be performed using the processes and user interface mechanisms described above for captioning of still images. In step S3118, the full resolution image is preprocessed, as described above in connection with preprocessing step S202. In step S3120, the full resolution image is analyzed for optimal caption location and stylization (preferably including color). Step S3120 can be performed by implementing steps S205 to S240 of FIG. 2, and the processes of FIGS. 3 and 4. The optimized caption characteristics determined in step S3120 are then used in step S3122 to generate an output result. In some embodiments, the output in step S3122 may include display of the captured full-resolution image with a stylized caption overlaid thereon. In other embodiments, the final image with stylized caption may be stored locally (i.e. stored to local disk or persistent memory), dropped into an editor for further adjustments by the user (e.g. further adjustment of caption text size and angle of rotation by the user via touch gestures and/or user interface indicia such as buttons or sliders (potentially analogous to the size adjustment UI mechanism of FIG. 14)), shared via a social network, stored in a remote file share, or the like.

Stability Mechanisms

Because the camera app live preview mechanism rapidly re-determines optimized caption location, the resulting display can appear jumpy, with the caption moving rapidly around the previewed image as the camera is reframed. Therefore, it may be desirable to implement mechanisms to reduce the speed or frequency with which the recommended caption moves around an image to be captured. For example, the preview frame sample and/or processing rate can be controlled to limit the frequency with which new caption locations are calculated; it has been found that frame processing periods of approximately 0.42 seconds may be appealing to some users. In some embodiments, a threshold level of improved location score can be set for adjusting the position of the caption. Improved caption locations nearer to the currently-previewed location require a lower threshold level of improvement to update the text position. New positions further from the current position require a greater amount of total score improvement in order to be selected as a new preferred caption location. This type of mechanism reduces the likelihood of a caption bouncing rapidly around disparate portions of the display screen, and increases the likelihood of a caption position smoothly adjusting its position on the screen.

In some embodiments, other stability mechanisms can be implemented to control the location of the caption during video preview. For example, two or more criteria may be configured in order to change the location of a caption. It may be desirable for a caption location adjustment to be subject to both a minimum threshold amount of improvement in location score, as well as a minimum distance of caption position change. With such a mechanism, the caption text may not be moved if, e.g., the total score after moving would be nearly the same as the prior position, and the center point of the text is at a very similar position as the prior preview frame.

In some embodiments, stability mechanisms can additionally or alternatively be applied to color determinations, to reduce the likelihood of users experiencing rapid oscillation of caption color between color options having similar scores. For example, a threshold level of total score improvement may be required before permitting a change of text color between successive sampled video frames. This may eliminate changes in optimal caption color unless and until a new color presents a significant improvement over a prior color selection.

Composition Aids

Figure 32:
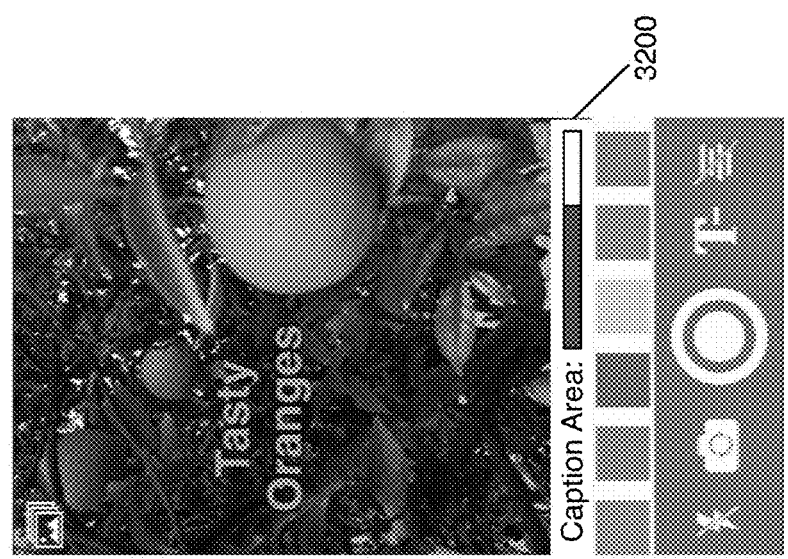

In some embodiments, it may be desirable for a camera preview application to provide composition aids rendered on the device display. For example, in the embodiment of FIG. 32, bar meter 3200 provides a user interface indicia indicative of the location score calculated for the current caption position. Alternatively, the bar can show the total score of overall suitability for text locations based on background lightness, darkness and smoothness of the best candidate text locations. Bar meter 3200 is updated for each video feed sampled frame that is processed (e.g. subject to steps S3104 through S3112 in the embodiment of FIG. 31), thereby providing the user with near-real time feedback on the extent to which the current camera framing is susceptible to visually-pleasing captioning. In some embodiments, it may be desirable to configure a threshold desired location score, such that bar meter 3200 is rendered in one color (e.g. green) for location scores exceeding the threshold desired location score, and rendered in another color (e.g. red) for location scores that fail to meet the threshold desired location score, thereby providing quick and intuitive user feedback as to whether the current camera composition is suitable for captioning.

Figure 33:
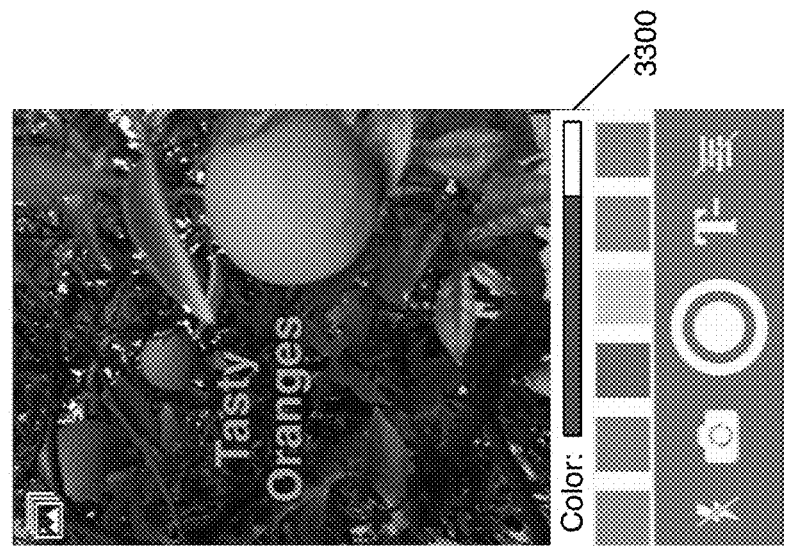
FIGS. 32-35 are user interfaces having captioning aids rendered during display of preview video.

FIG. 33 illustrates another embodiment, in which bar meter 3300 provides a user interface indicia indicative of the color score calculated for the current caption position. Alternatively, the bar can show total score of good and excellent colors that can be extracted from the image for coloring the text. Like bar meter 3200, bar meter 3300 is updated for each video feed sampled frame that is processed, thereby providing the user with near-real time feedback on the extent to which the color content of the current camera framing will yield visually pleasing captioning results. As with the location indicia of FIG. 33, meter bar 3300 may also change color depending on whether a threshold color score is met.

Figure 34:
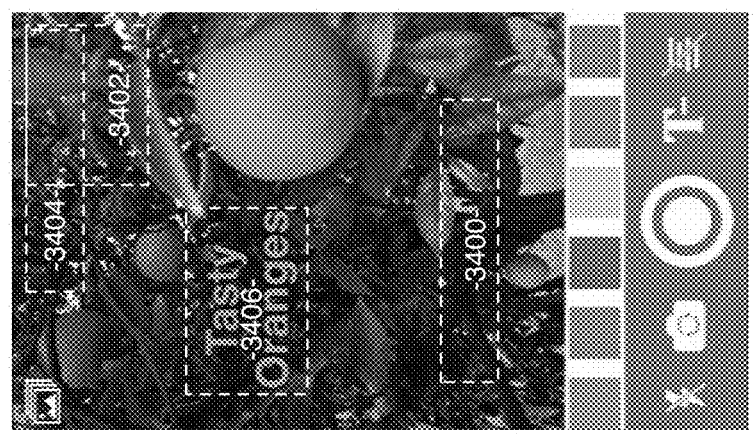

Other composition aids may guide the user by illustrating locations on the current camera framing that are susceptible to captioning. FIG. 34 illustrates such an embodiment. Caption location boxes 3400, 3402, 3404 and 3406 are rendered as indicia (such as the dashed-line boxes illustrated in the embodiment of FIG. 34) on a mobile device user interface display to indicate four highest-scoring text locations determined during location scoring, e.g. during step S3108 in the embodiment of FIG. 31. The user can thereby adjust image framing to achieve a desired captioning position before taking a photograph.

Figure 35:
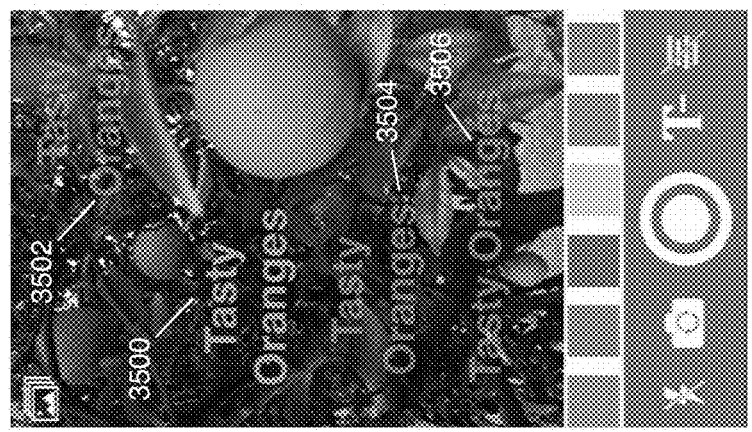

In some embodiments, caption previews can be rendered at multiple locations, thereby simultaneously illustrating multiple caption location-color combination options. It may be desirable to render the caption at the highest-scoring location in fully-opaque text, while rendering caption text at alternative (i.e. lower scoring) locations in text having reduced transparency, thereby visually conveying to the user the preferred and alternative caption locations given the current camera framing. FIG. 35 illustrates such an embodiment, where preferred caption preview 3500 is rendered with full opacity, while alternative location captions 3502, 3504 and 3506 are rendered with reduced opacity (in this case, 75% opacity).

These and other compositional aids can be rendered alone or in various combinations, in order to assist users with framing photos and video for optimal captioning.

Other Applications

Techniques described herein can also be beneficially applied to any application in which it is desirable to add known text content to an image or video content. For example, embodiments could be used for automated image captioning by web services, such as e-commerce sites. An e-commerce retailer may desire to display a product image captioned with the product name, the retailer name, product metadata and/or other text content. Embodiments of the caption location and color optimizations described herein can readily be employed by a web application to rapidly and automatically generate captioned product images for display on a web site or mobile app.

In another application, advertising copy could be overlaid on video content in an automated manner, while helping ensure that the advertising copy has a location and color that is visually pleasing, readable, and avoids interference with video content. This may avoid issues common to current mechanisms for displaying advertisements over video content that tend to be insensitive to video content, obscuring important portions of the video content and being generally displeasing to the viewer. In a related application, copyright notices can be overlaid on video content in an automated manner, having a location and stylization that is also visually pleasing, readable and avoids interference with the video content.

In yet another application, a security video feed with facial recognition could be used to identify individuals and automatically overlay their names proximate their faces, in a manner that is readable and minimizes obscuring of important detail. Names of individuals in a company directory could automatically be added proximate their photos. In another example, names of locations and dates could automatically be added to photos within a photo album, if such metadata is available.

Color Preference Server

In accordance with another aspect, a color preference server can be utilized. In some embodiments, a color preference system can be used by mobile applications, such as those described elsewhere herein, to customize color rendering and other stylization to match a user's preferences, whether enhancing application functionality, making the application's user interface more desirable, or both. By implementing a color preference system as a network-connected service, information regarding color preference can be leveraged across a plurality of applications and devices, both in terms of retrieving color preference information for use within the application, and/or reporting color preference information for centralized aggregation.

In addition to enhancing application functionality and appearance, color can be one of the most influential factors for consumers when choosing a product to buy. In some embodiments, the Color Preference System enables the color of online advertisements to be customized to individual users based on their color preferences, which can increase click through rates and the overall success of the advertising campaign.

Figure 24:
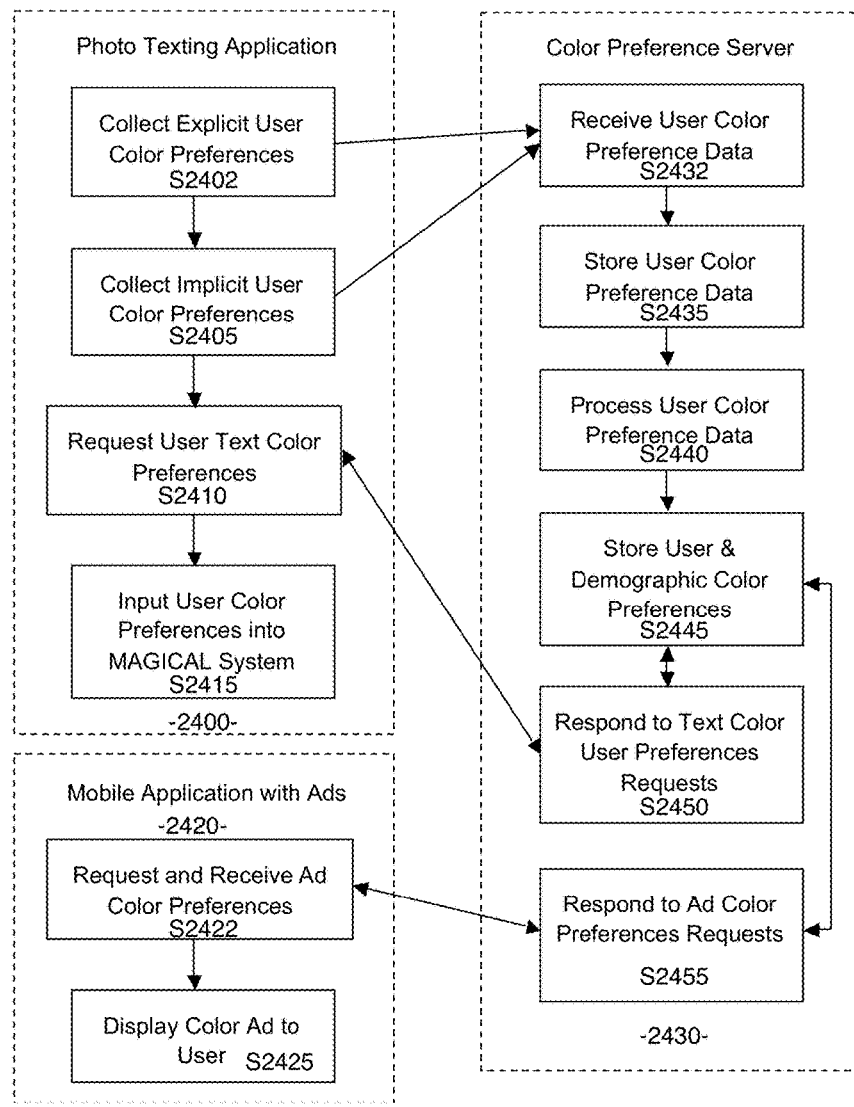
FIG. 24 is a process diagram for an embodiment with network-connected color preference server.

FIG. 24 illustrates an embodiment of processes via which color preference server 100A can be utilized in the environment of FIG. 1A. Process 2400 illustrates processes relating to use of preference server 100A in connection with a photo texting application, such as those described elsewhere herein, executed on a user device 120. In step S2402, a user device collects explicit user color preferences. The user enters their color preferences via an application user interface, such as a mobile app running on mobile devices 120B, 120C, 120D, or 120E; a web browser operating on any of user devices 120; a desktop application executed on PC 120A; or a voice recognition system or augmented reality system implemented via any of user devices 120. Examples of sources for collection of explicit user color preferences include a Photo Texting or Messaging mobile application, or Facebook profile. To do this, the user can simply select or state their favorite colors by interacting with a device user interface. In other embodiments, a palette of colors can be shown and a user can be asked to select their favorite color, least favorite color, and/or rank multiple colors by preference. More detail can be requested by showing each of these colors that contrast well with a black, white and mid-brightness gray background and having the user select their favorite and least favorite or rank the different foreground colors for each background shown. In addition, simple color tests to determine if the user has some form of color blindness such as red-green can be displayed. For example, the Ishihara Color Blindness Test, which shows a number of images, all of which place a colored number consisting of dots inside a circle of big dots, and the test subject is what the number is or line looks like. Once these preferences, which include color foreground and background pairs along with their level of preference and color blindness data, have been gathered, they are sent to Color Preference Server 100A via a network call (e.g. web services call) on network 110, and stored by server 100A within database 104 in records associated with the user for whom the collected color preference information applies. The user is typically denoted by a user ID, which can be their Facebook ID, email address, phone number or other common ID. The user may have a user profile listing some or all of these IDs, a unique internally-assigned user identification number, as well as additional information about the user. The user profile may also list age, gender, geographic location and interests. Explicit color preferences from other applications can also be sent to the Color Preference Server.

In step S2405, implicit user color preferences are collected by a user device. For example, every time a user selects a color using a mobile app, web service or other platform configured to operate with preference server 100A, information associated with the selection is transmitted to the Color Preference Server. For example, in the context of the image-text overlay applications described herein, when a user finalizes a color selection for text content using device 120, the selected text color and the background color on which the text has been placed, is transmitted to server 100A. This could be from a Photo Texting or Messaging application when selecting the color of text, setting preferred background color in an application or anywhere else where the user is asked to pick a color. Their color preferences could also be selected from the dominant, secondary and tertiary colors of images they select. In the case of the MAGICAL application described herein, whether the color was an extracted color or a predefined color is also included in the data sent to the Color Preference Server via a network call such as a web services call.

In step S2432, data indicative of external preferences from step S2402 and data indicative of implicit preferences from step S2404, is received by color preference server 100A in step S2432. In some embodiments, the Color Preference Server 100A receives that information via network 110 from an application implemented on user device 120, via a web service or similar method (e.g. TCP). Note, that data can also be input from other web services or via batch processing.

In step S2435, the data received from user devices in step S2432 is stored in persistent data storage (such as database 104) for future use, including analysis and processing by Color Preference Server application logic 102.

In step S2440, application logic 102 operates to analyze the color preference user data, preferably seeking correlations between anonymized color preference data for each gender, each age group and each geographic location, interests and various combinations thereof. For each user and combination, color preferences are derived along with a probability and confidence of preference. To determine the recommended hue, the method of processing could be as simple as adding up all data points for each user for each hue and dividing by the total number of data points for that user to determine the probability that they would prefer each hue. Clustering or more complex data analytics can also be used. In terms of the results produced, for example, if there are 10 color preference data points for a user and 9 of them are for a dark blue then probability level that a user liked dark blue would be very high (90%) as would the strength of the recommendation. Likewise if 30% of male users in North America liked dark blue and there were hundreds of thousands of data points, then the probability that a new North American male liked dark blue would be 30% and the confidence level in that recommendation would be very high. Whereas if user had two data points that were both pink the estimated probability would be 100% they liked pink but the confidence level would be quite low.

In step S2445, server 100A operates to store user and demographic color preferences. Once the processing is finished, the color preferences are stored persistently (such as within database 104) for future use so when a user or set of demographic information is requested, the results can be quickly looked up and returned in a web services response from the Color Preference Server to the client application.

In step S2410, the user device application requests user text color preferences. When the application is using the MAGICAL algorithm to determine what colors to recommend to the user for each specific Text Location, it can optionally make a call to the Color Preference Server. This server request can optionally include the average background color of the Text Location region. The Color Preference Server will return whether it has color preferences for that user, the probability and confidence level of each of the color preference recommendation and information about each of those color preferences. The user color preference can include: preferred colors, which include the color as defined in color space such as RGB, HSB, etc.; preferred hues; preferred brightness level for dark backgrounds and light backgrounds; saturation preference, optionally by hue and optionally for dark and light backgrounds; optimal brightness adjustment for dark and light backgrounds optionally by hue; and optimal saturation adjustment for dark and light backgrounds optionally by hue.

In accordance with another application of the color preference server concept, application (mobile or non-mobile) ad color preferences can be tracked and served to user devices. In some embodiments, when a mobile (or non-mobile) application wants to display an advertisement to a user, it performs process 2420 comprising the following steps:

Request Ad Color Preference from the Color Preference Server via a network request (step S2422). The request can include any or none of these: User ID (if not included, then color preferences may be based on the other demographic info provided or else the average across all users); Age; Gender; Geographic Location; Device information; Interests (e.g. Gaming, Fishing); Category of Advertisement (e.g. Fashion, Fast Food); Average background color; Dominant background color; Secondary and tertiary background colors; Color palette; Foreground color; Style (e.g. best looking, vivid, grunge, warm, cold).

Receive an Ad Color Preference response from the Color Preference Server via the network (step S2425). The response will typically include whether the user or demographic has color preferences for that user or demographic, the probability and confidence level of each of the color preference recommendations, and information about each of those color preferences. This response can include: Preferred foreground colors; Preferred background colors; Preferred foreground and background color combinations; preferred hues; preferred brightness level for dark backgrounds and light backgrounds; and saturation preferences, optionally by hue and optionally for dark and light backgrounds.

The Mobile Application will then construct the mobile advertisement using the color recommendations and present it to the user. This could include setting the foreground and/or background color of the advertisement. It could also include selecting an advertisement from amongst a plurality of ad versions or alternative advertisement choices, to increase the prevalence or display rate of ads that incorporate the user's preferred colors. By increasing the frequency with which advertisements are displayed having colors and color combinations preferred by a user, the strength of user impression and/or the click through rate may be increased.

Server 100A (FIG. 1) can be utilized to implement such a color preference server. In the embodiment of FIG. 1, color preference server 100A implements application logic 102, and operates to store information within, and retrieve information from, database 104. The term "database" is used herein broadly to refer to a store of data, whether structured or not, including without limitation relational databases and document databases. Web server 106 hosts one or more Internet web sites enabling outside user interaction with, amongst other things, application logic 102 and database 104. Messaging server 108 enables messaging, such as email, app notification, SMS or MMS communications, between server 100A and user devices 120.

While depicted in the schematic block diagram of FIG. 1 as a block element with specific sub-elements, as known in the art of modern web applications and network services, server 100A may be implemented in a variety of ways, including via distributed hardware and software resources and using any of multiple different software stacks. Server 100A may include a variety of physical, functional and/or logical components such as one or more each of web servers, application servers, database servers, email servers, storage servers, SMS or other instant messaging servers, and the like. That said, the implementation of server 100A will include at some level one or more physical servers, at least one of the physical servers having one or more microprocessors and digital memory for, inter alia, storing instructions which, when executed by the processor, cause the server to perform methods and operations described herein.

While certain system infrastructure elements are illustrated in particular configurations, it is understood and contemplated that functional elements can be readily integrated and/or implemented via various alternative combinations of hardware and software, as would be known to a person of skill in the field of information systems design. For example, while preferred embodiments may be implemented by software for execution on a mobile device, it is contemplated and understood that alternative embodiment may be implemented in various other combinations of software and/or hardware. While some of the above described embodiments include presentation of content via a smart phone or tablet computer app, it is contemplated and understood that a standalone PC application and/or web browser could be implemented in order to process and present content as described hereinabove. These and other variations are contemplated.

While certain embodiments have been described with user interfaces based on touch screen interactions, it is contemplated and understood that other embodiments could additionally or alternatively implement other forms of user interaction for achieving the functionality and results described herein. For example, voice-based operation may be particularly useful when implemented by certain user devices such as a smart watch, smart phone or smart glasses.

Moreover, while certain embodiments of the invention have been described herein in detail for purposes of clarity and understanding, the foregoing description and Figures merely explain and illustrate the present invention and the present invention is not limited thereto. It will be appreciated that those skilled in the art, having the present disclosure before them, will be able to make modifications and variations to that disclosed herein without departing from the scope of the invention or appended claims.

The invention claimed is:

1. A computer-implemented method for overlaying text content on a digital image with a foreground text color computed automatically given a particular text location region and size on the image, the method comprising the steps of:
    extracting all unique colors from an initial image by examining each of the image pixels, in order to create a foreground color set;
    filtering the foreground color set to remove one or more colors;
    for each foreground color in the filtered foreground color set:
        identifying one or more cluster colors, the cluster colors comprising colors that are similar to the foreground color; and
        calculating a cluster color count by summing the number of occurrences within the image of cluster colors;
    filtering out foreground colors that do not sufficiently contrast with the average background color of the text location region;
    sorting foreground colors by color contrast score;
    filtering non-distinct foreground colors;
    adding to the foreground color set one or more predetermined colors that contrast with the average background color of the text location region;
    selecting a rendering color from amongst the foreground color set; and
    generating an output image comprising text rendered in the rendering color at the text location region, over the initial image.

2. The method of claim 1, further comprising the preceding step of compressing the initial image.

3. The method of claim 1, in which the step of filtering the unique foreground color set comprises removing colors having a pixel count below a threshold occurrence level.

4. The method of claim 1, in which the step of filtering unique foreground color set comprises removing colors with low cluster counts.

5. The method of claim 1, in which the step of filtering the unique foreground color set comprises removing any colors within a set of undesirable colors.

6. The method of claim 1, in which the step of filtering the unique foreground color set comprises deduplicating similar colors.

7. The method of claim 5, in which the set of undesirable colors comprises colors having low saturation.

8. The method of claim 5, in which the set of undesirable colors comprises colors previously specified by a user as being undesirable.

9. The method of claim 5, in which the method is performed by a handheld user computing device, and the set of undesirable colors comprises colors determined to be undesirable based on prior interactions of a user with an application implemented by the computing device.

10. The method of claim 1, in which the step of filtering out foreground colors that do not sufficiently contrast with the average background color of the text location region comprises one or more of the following substeps:
    excluding foreground colors having a perceived brightness difference that exceeds a perceived brightness threshold amount;
    excluding foreground colors having a perceived color distance greater than a perceived color difference threshold amount; and
    excluding from a cluster, foreground colors that are not in the same or adjacent slice when mapped into a color wheel.

11. The method of claim 1, further comprising the step of: for each foreground color, comparing the foreground color to its cluster colors and, if any cluster color has a higher color contrast score relative to the average background color of the text location, replacing the foreground color by the cluster color with the highest color contrast score.

12. The method of claim 1, further comprising the step of: prior to the step of filtering out foreground colors that do not sufficiently contrast with the average background color of the text location, boosting foreground colors to enhance appearance by modifying saturation and brightness in order to improve contrast relative to the average background color of the text location region.

13. The method of claim 1, in which the color contrast score is computed in part based on two or more of the following:
    (a) the color distance between the foreground color and the average background color of the text location;
    (b) the perceived brightness distance between the foreground color and average background color of the text location;
    (c) the perceived brightness distance between the foreground color and the range of background colors of the text location;
    (d) a saturation bonus for well saturated colors;

(e) a cluster count bonus; and (f) a bonus or penalty for predetermined foreground-background hue combinations including: a penalty for color combinations difficult to distinguish for color blind persons, and a bonus for warm/cool color combinations.

14. The method of claim 1, in which the method is performed by a handheld user computing device comprising a microprocessor, and the step of selecting a rendering color is performed automatically by the microprocessor.

15. The method of claim 14, in which the step of selecting a rendering color comprises the step of selecting, from amongst the foreground colors, a rendering color having the highest color contrast score relative to the average background color of the text location.

16. The method of claim 1, in which the method is performed by a handheld user computing device comprising a microprocessor and a display screen; and in which the step of selecting a rendering color comprises:

displaying on the display screen one or more color indicia for colors from the filtered foreground color set, the one or more color indicia selected at least in part based on a color contrast score relative to the average background color of the text location region; and receiving a rendering color selection from amongst the filtered foreground color set via user selection of a color indicia.

17. The method of claim 16, in which the step of selecting a rendering color further comprises:

displaying on the display screen a preview image comprising text rendered over the initial image at the text location region in a preview color; and displaying on the display screen one or more additional color indicia, the additional color indicia associated with colors sharing a common color cluster with the preview color.

18. The method of claim 1, in which the step of generating an output image further comprises applying a background effect to the text by adding semitransparent darker or lighter pixels around the text to enhance the contrast.

19. A computer-implemented method for overlaying text content on a digital image, the method comprising:

determining a ranked list of candidate text location regions by calculating location scores for each of a plurality of candidate text location regions within an initial digital image, the location regions scores determined at least in part based on perceived brightness of the candidate text location region, favoring locations with particularly dark or particularly light perceived brightness to allow placement of more colorful and higher contrast text color, as well as one or more of the following location region score components:

(a) color similarity of the candidate text locations within the initial image;

(b) the position of the candidate text location region within the image, (d) whether the text is centered within the initial image, (e) whether the text is near the top of the initial image, (c) the presence and magnitude of extra pixels around the candidate text location region having color similarity to the candidate text location region, (d) whether the candidate text location region encroaches on a region identified by a subject detection component as containing a face, (e) the presence of detected edges within the candidate text location region, and (f) the size of the candidate text location region, and (g) the extent to which initial image content within the candidate text location region is blurry;

determining a ranked list of text colors associated with one or more of the candidate text locations, the text colors being ranked based on a color score calculated for each text color, the color score determined at least in part based on criteria comprising difference in perceived brightness between the text color and colors of a portion of the digital image corresponding to the text location region;

selecting a preferred text location region based at least in part on the text location scores;

selecting a preferred text color from the ranked list of text colors; and generating a second digital image comprising the initial digital image, having said text content rendered at the preferred text location region with the preferred text color.

20. The method of claim 19, in which the method is performed by a user computing device having a display screen, the method further comprising: soliciting user input comprising the text content by rendering user interface elements on the display screen.

21. The method of claim 19, in which each of the steps are performed by a user computing device having a display screen.

22. The method of claim 21, further comprising the step of:

querying a user for selection of the initial image from amongst a plurality of images previously-stored within, or available for download to, the user computing device.

23. The method of claim 21, further comprising the step of:

sampling the initial image from a video stream recorded by a camera module within the user computing device.

24. The method of claim 19, further comprising the preceding step of compressing the initial image to reduce its resolution.

25. The method of claim 19, in which the step of determining location region scores comprises determining location scores using a weighted combination of each of the location score components.

26. The method of claim 25, further comprising the step of optimizing the location region score component weights using a machine learning optimization component.

27. The method of claim 19, in which the step of determining a ranked list of candidate text location regions comprises filtering candidate text locations to remove overlapping locations.

28. The method of claim 19, in which the step of determining a ranked list of candidate text location regions comprises filtering candidate text locations having a location score that fails to exceed a minimum threshold location score.

29. The method of claim 19, in which the step of determining a ranked list of candidate text location regions comprises filtering candidate text locations to limit the ranked list length to a predetermined number of locations.

30. The method of claim 19, in which the method is performed by a user computing device having a display screen, and in which the step of selecting a preferred text location comprises presenting user interface elements enabling user selection of a preferred text location from amongst one or more of the candidate text location regions.

31. The method of claim 19, in which the method is performed by a user computing device having a display screen, and in which the step of selecting a preferred text color comprises presenting user interface elements enabling user selection of a preferred text color from amongst one or more of the ranked list of text colors.

32. The method of claim 19, in which:
   the step of selecting a preferred text location region comprises automatically selecting the text location region having the highest text location region score; and
   the step of selecting a preferred text color comprises automatically selecting the highest rank color from amongst the ranked list of text colors.

33. A computer-implemented method for overlaying text content on a digital video feed, the method comprising:
   periodically sampling frames from the video feed;
   processing some or all of the sampled frames by:
      compressing the sampled frame to reduce its resolution;
      calculating a location score for each of a plurality of candidate text locations within the sampled frame, the location score determined at least in part based on perceived brightness of the candidate text location region, favoring locations with particularly dark or particularly light perceived brightness to allow placement of more colorful and higher contrast text color; the location score further comprising one or more of the following location score components: color similarity within a region of the sampled frame associated with the candidate text location, the position of the candidate text location within the sampled frame, the presence of extra pixels around the candidate text location having color similarity to the candidate text location, whether the candidate text location encroaches on a region identified by a subject detection component as containing a face, the presence of detected edges within the candidate text location, and the extent to which sampled frame content within the candidate text location is blurry;
      selecting a preferred text location based at least in part upon the location scores; and
      selecting a preferred color associated with the preferred text location, the preferred color being selected based on criteria comprising difference in perceived brightness between a color and colors in a portion of the sampled frame corresponding to the preferred text location; and
   displaying a composite of the video feed and the text content overlaid thereon, the text content rendered at the preferred text location and with the preferred text color.

34. The method of claim 33, in which the digital video feed is a digital camera viewfinder preview rendered on a display of a user computing device, the method further comprising:
   in response to depression of a user computing device shutter button, capturing a full-resolution image via a user computing device camera;
   determining a ranked list of final text location candidates by calculating location scores for each of a plurality of final text location candidates within the full-resolution image;
   determining a ranked list of final text color candidates associated with one or more of the final text location candidates, the final text color candidates being ranked based on criteria comprising color contrast relative to a portion of the full-resolution image corresponding to the text location; and
   displaying an output image on the user computing device display, the output image comprising the full-resolution image, and the text content overlaid thereon at one of the final text location candidates, rendered in one of the final text color candidates.

35. A method for sharing image content via social media using a mobile computing device, the method comprising:
   selecting an initial image from amongst a plurality of images stored on the mobile computing device;
   calculating location scores for each of a plurality of candidate text locations within the initial image, the location score determined at least in part based on perceived brightness of the candidate text location region, favoring locations with particularly dark or particularly light perceived brightness to allow placement of more colorful and higher contrast text color; the location score further comprising one or more of the following location score components: color similarity within a region of the initial image associated with the candidate text location, the position of the candidate text location within the initial image, the presence of extra pixels around the candidate text location having color similarity to the candidate text location, whether the candidate text location encroaches on a region identified by a subject detection component as containing a face, the presence of detected edges within the candidate text location, and the extent to which initial image content within the candidate text location is blurry;
   selecting a preferred text location based at least in part upon the location scores;
   selecting a preferred color associated with the preferred text location, the preferred color being selected based on criteria comprising difference in perceived brightness between a color and colors in a portion of the initial image corresponding to the preferred text location;
   displaying a final image comprising a composite of the initial image and the text content overlaid thereon, the text content rendered at the preferred text location and with the preferred text color; and
   transmitting the final image to a social networking service.

36. The method of claim 35, in which the step of transmitting the final image to a social networking service comprises transferring the final image to a social networking application implemented on the mobile computing device.

37. The method of claim 35, in which the step of selecting an initial image from amongst a plurality of images stored on the mobile computing device comprises transferring the initial image from a social networking application implemented on the mobile computing device, to an image captioning application implemented on the mobile computing device.

38. The method of claim 19, in which the color score is further determined at least in part based on one or more of:
   (i) a hue bonus favoring colors based on the color hue;
   (ii) a saturation bonus favoring colors based on the color saturation level; and
   (iii) a percent color match with the initial digital image.

39. The method of claim 19, in which the step of selecting a preferred text location region based at least in part on the text location scores, comprises:
   sorting candidate text locations based on a total score comprising the text location scores and, for each text location score, a highest color score; and selecting a preferred text location based at least in part on the total score.

* * * * *